Nov. 5, 1940.   I. C. GELLMAN   2,220,367
BREAD WRAPPING MACHINE
Filed March 8, 1937   10 Sheets-Sheet 1
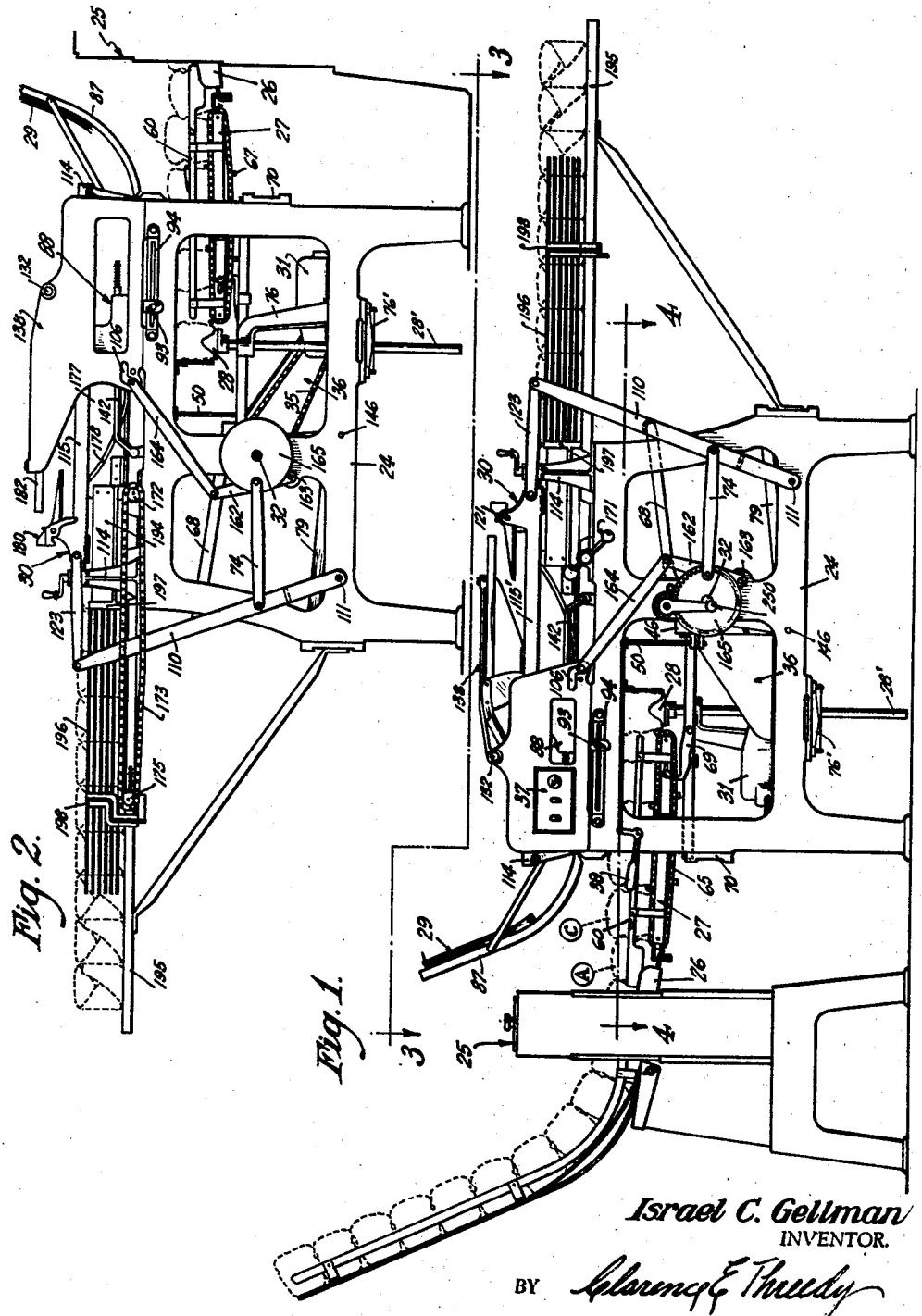
Israel C. Gellman
INVENTOR.
BY Clarence E. Threedy
HIS ATTORNEY.

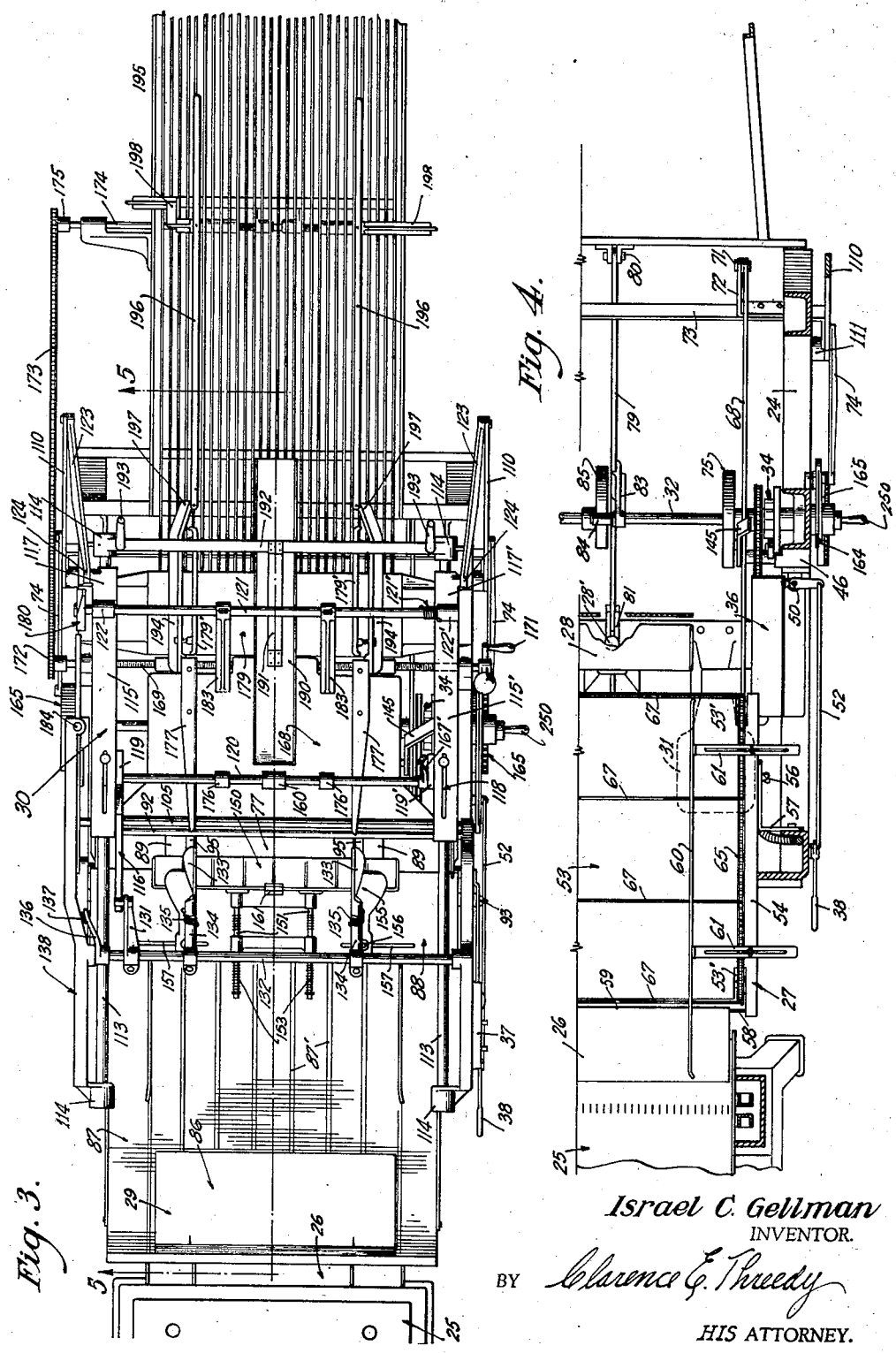

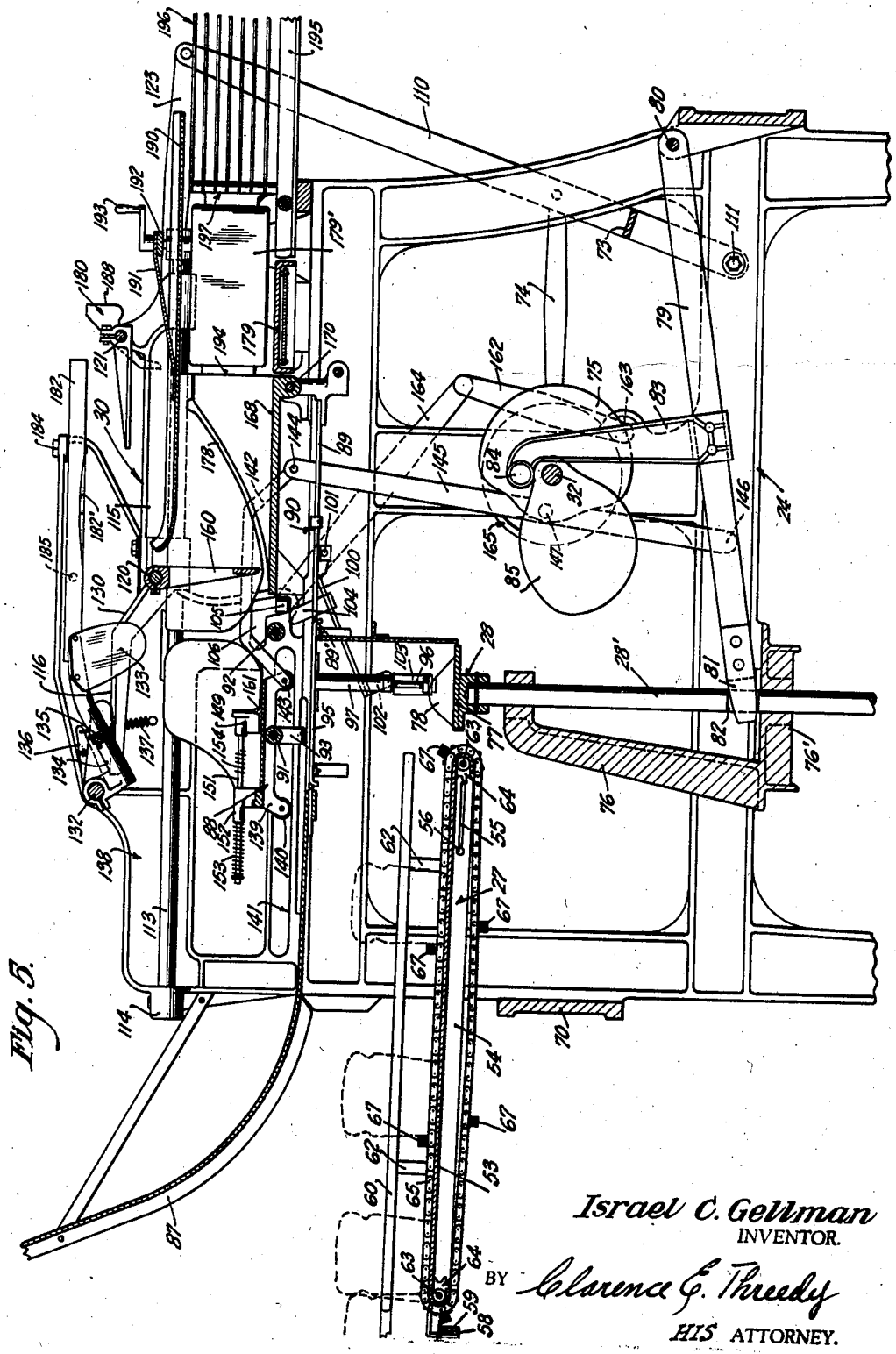

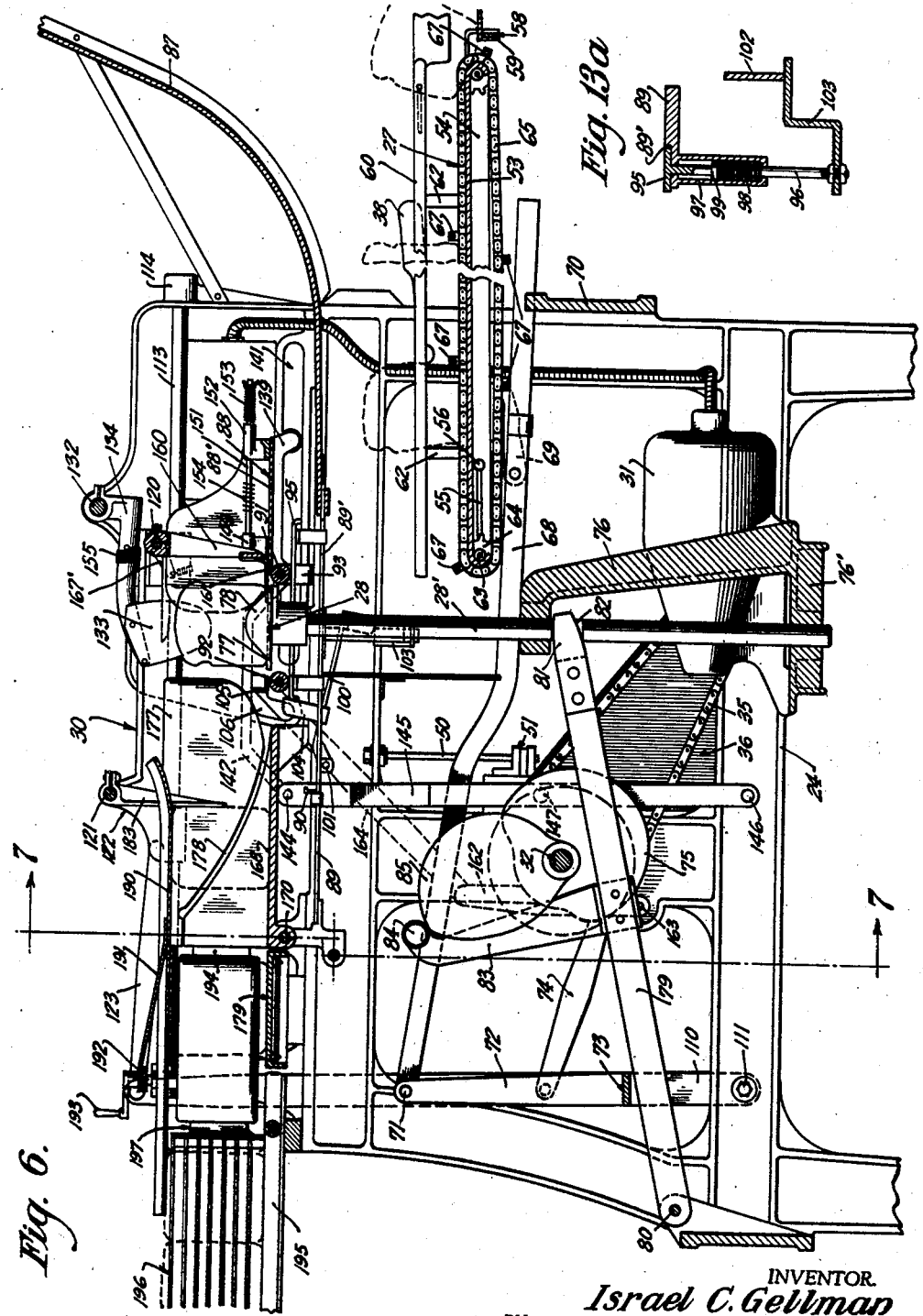

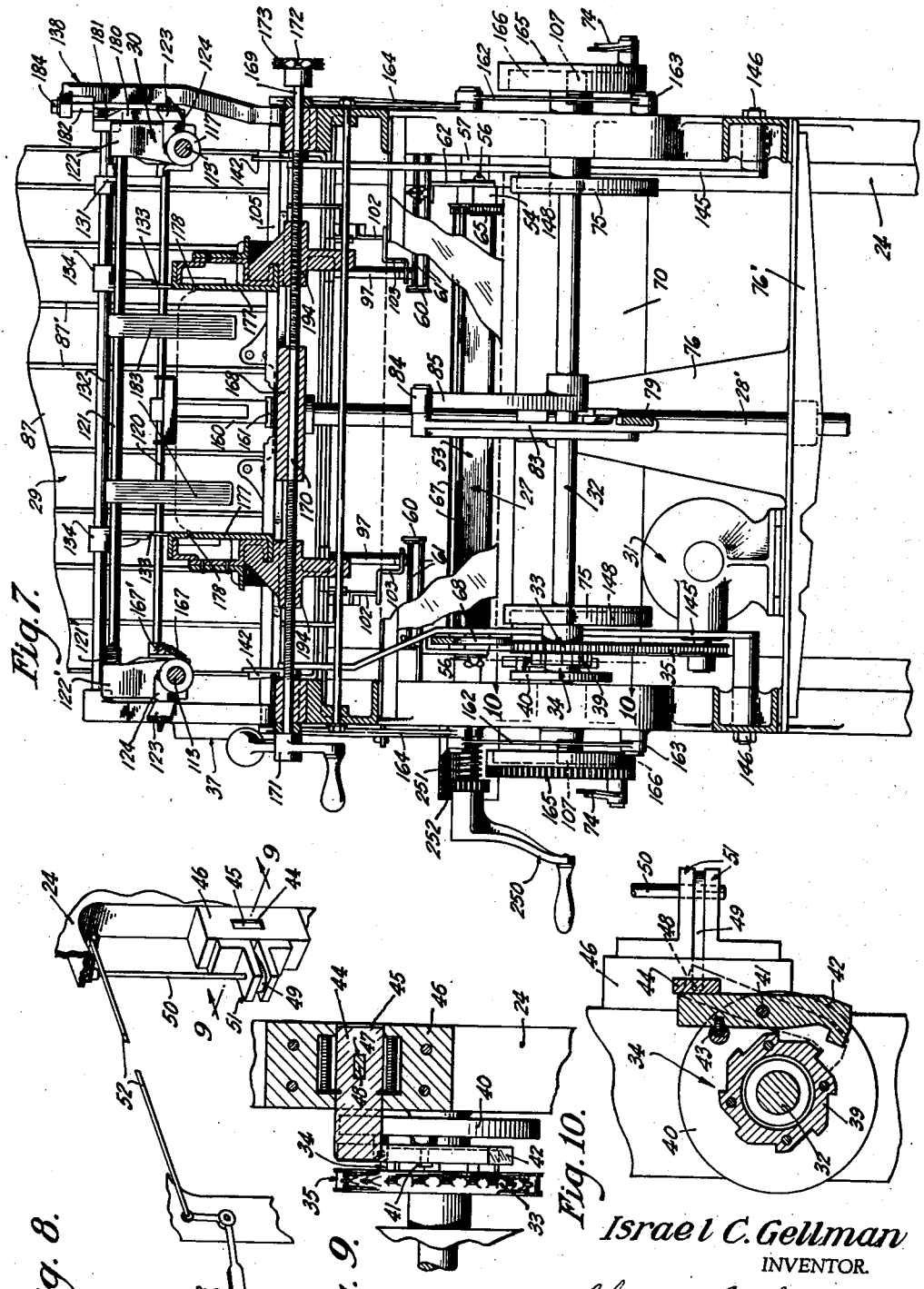

Nov. 5, 1940.　　I. C. GELLMAN　　2,220,367
BREAD WRAPPING MACHINE
Filed March 8, 1937　　10 Sheets-Sheet 6
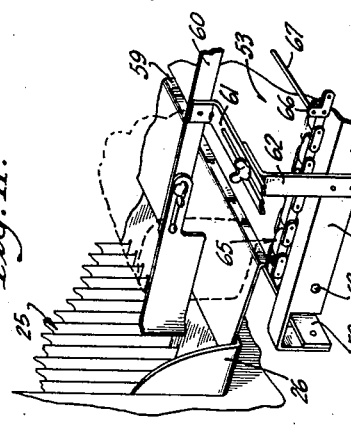
Israel C. Gellman
INVENTOR.
BY Clarence E. Threedy
HIS ATTORNEY.

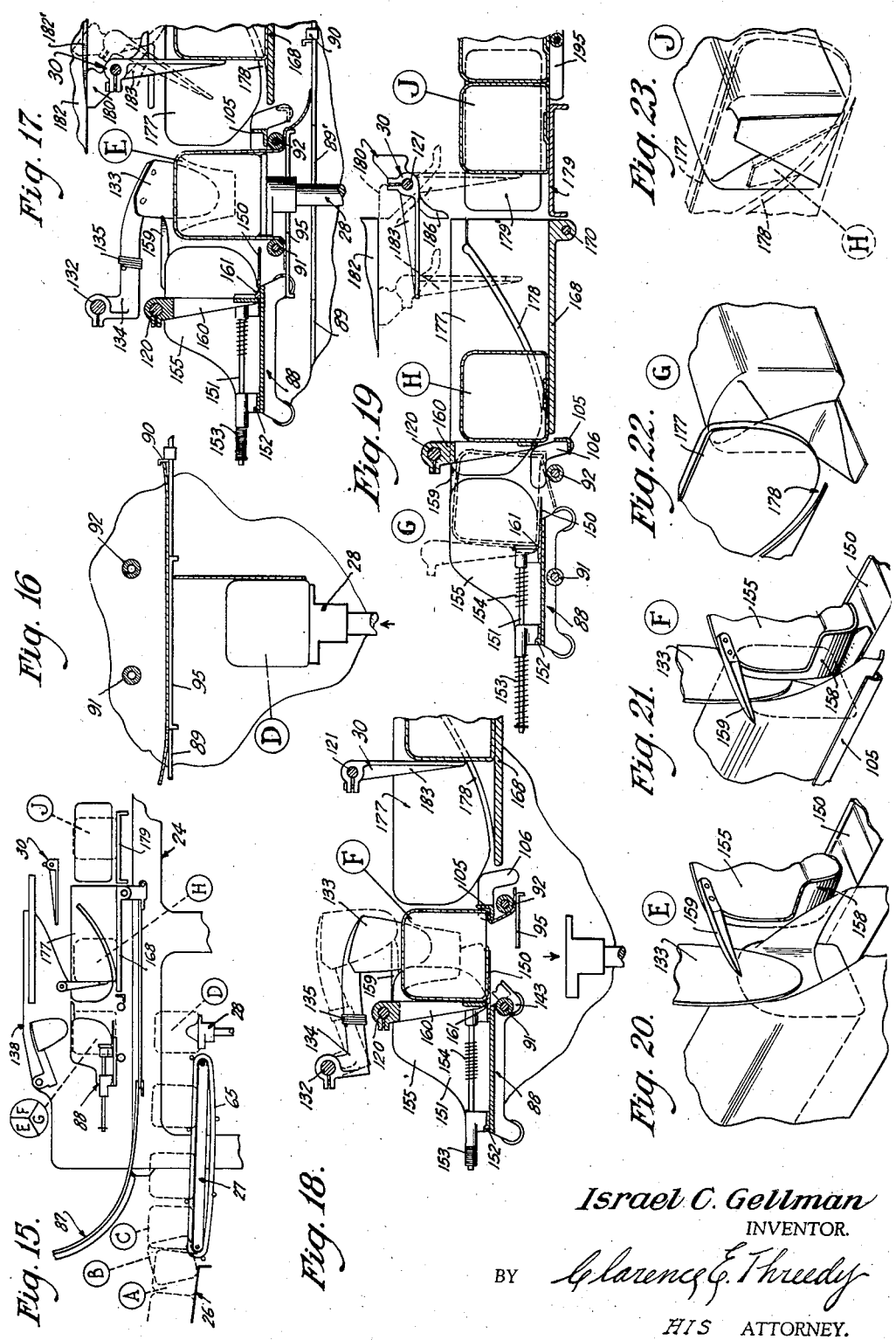

Nov. 5, 1940.　　　　I. C. GELLMAN　　　　2,220,367
BREAD WRAPPING MACHINE
Filed March 8, 1937　　　10 Sheets-Sheet 8
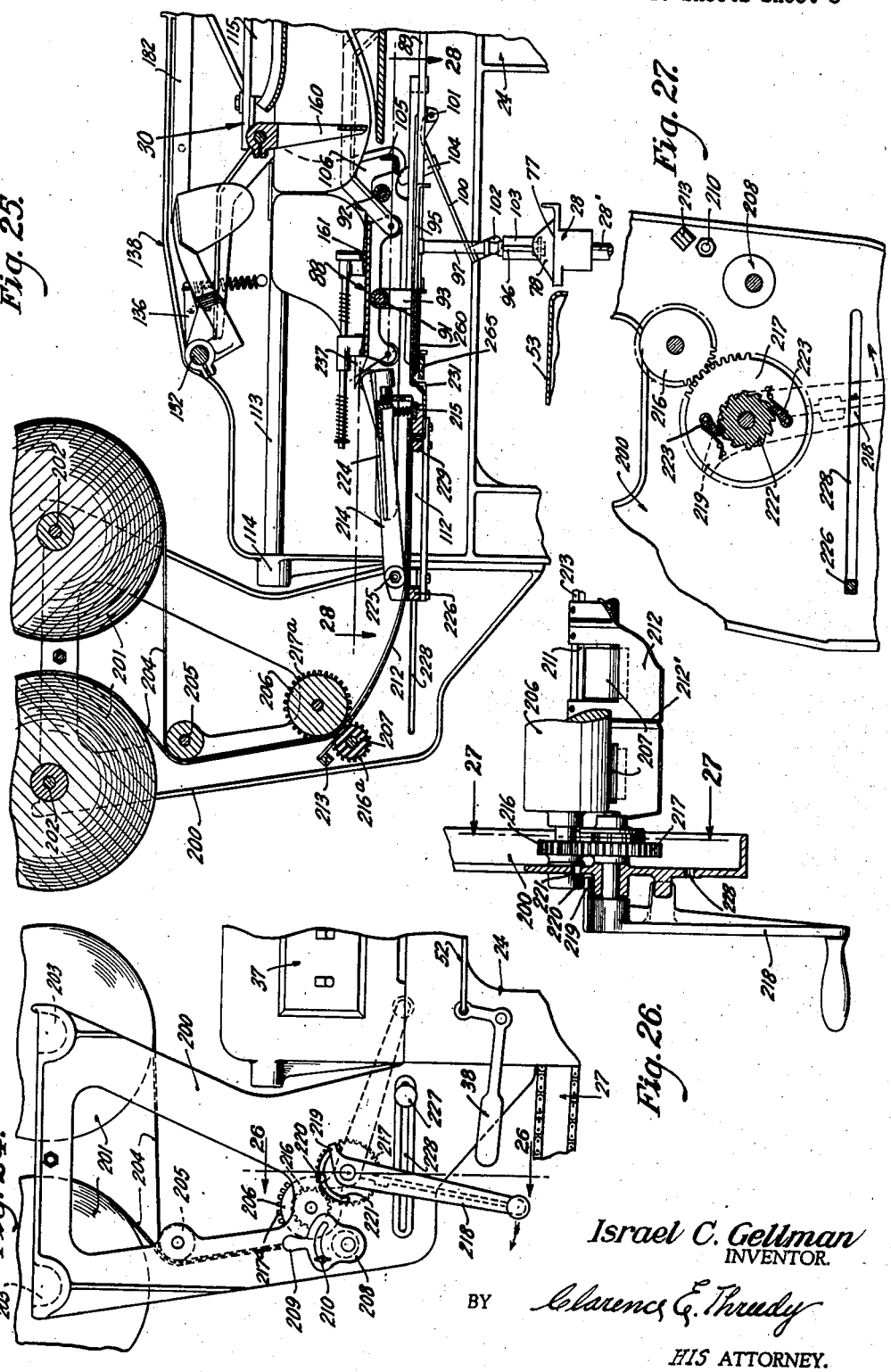
Israel C. Gellman
INVENTOR.
BY Clarence E. Threedy
HIS ATTORNEY.

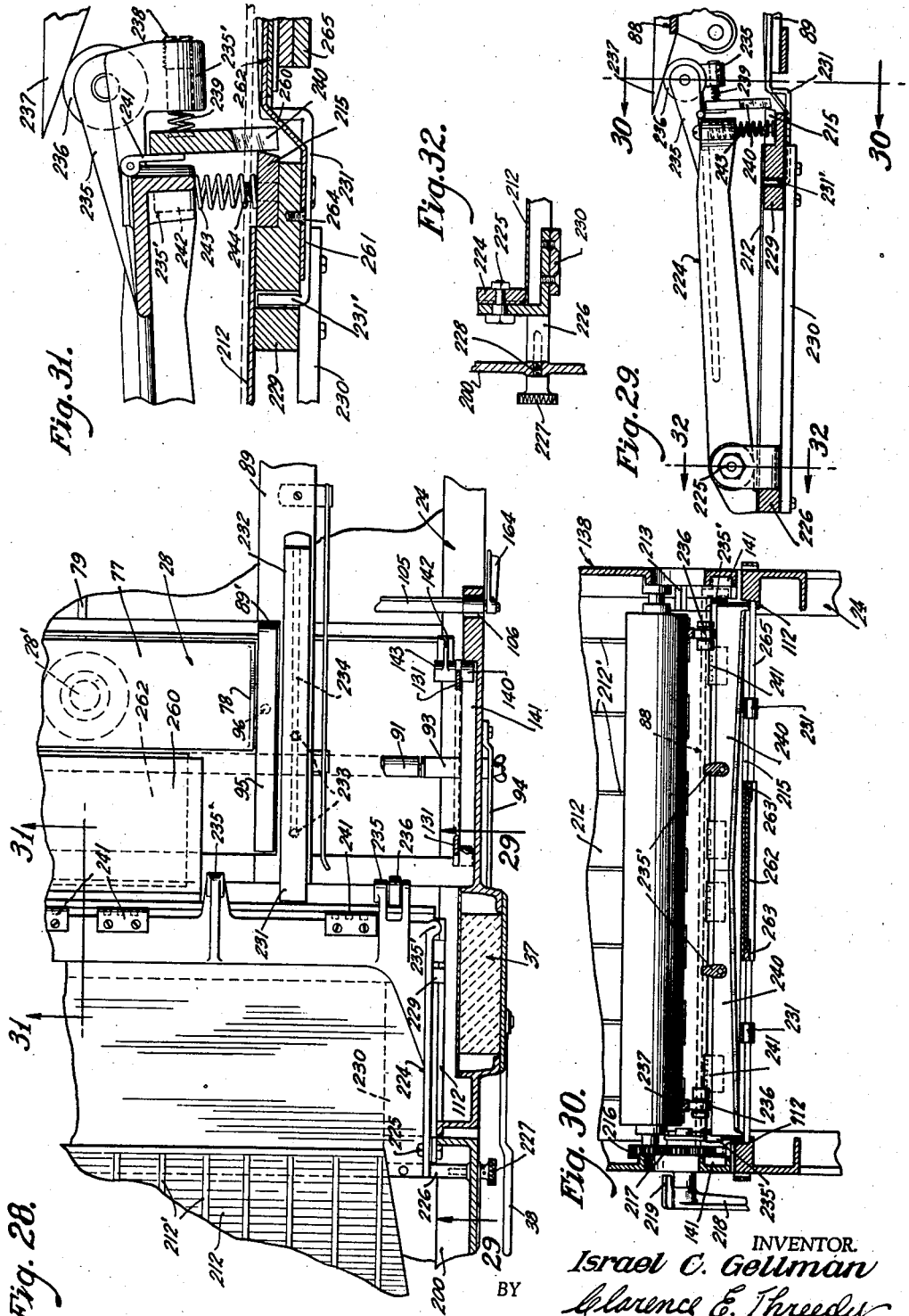

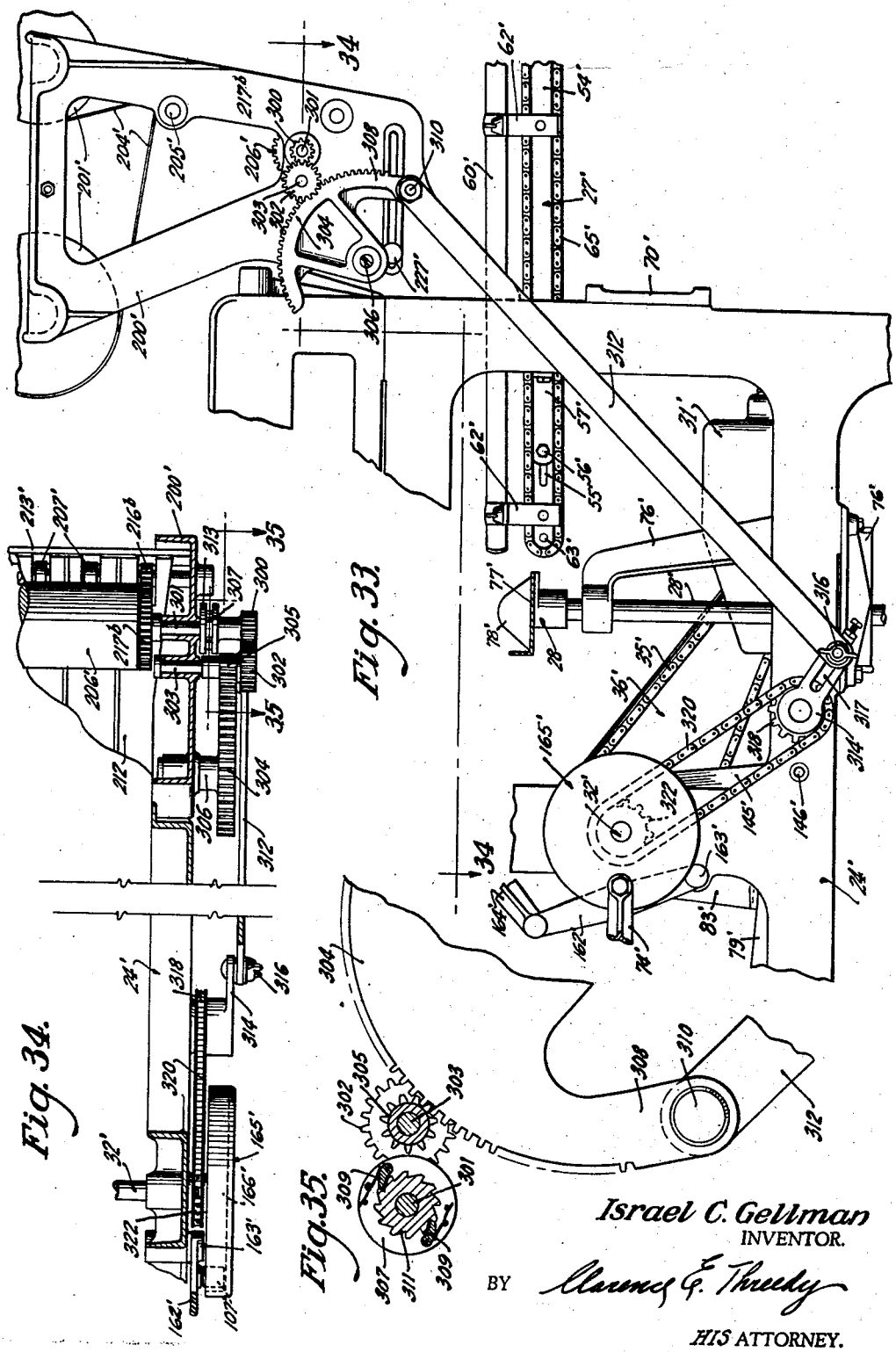

Patented Nov. 5, 1940

2,220,367

UNITED STATES PATENT OFFICE 2,220,367

BREAD WRAPPING MACHINE

Israel C. Gellman, Rock Island, Ill., assignor to Gellman Manufacturing Co., Rock Island, Ill., a corporation of Illinois Application March 8, 1937, Serial No. 129,561

26 Claims. (Cl. 93—2)

This invention provides improvements in bread wrapping machines, and has among its important objects the provision of a wrapping machine of the automatic class which is relatively simple in construction, rugged, easily operated, and because of its simplicity and novelty in design makes possible a machine comparable in efficiency and performance with much higher priced machines.

More specific objects of the invention are the provision of a wrapping machine adapted to handle and wrap sliced bread, and especially suitable for use with automatic slicing machines and having instrumentalities designed to convey the sliced bread in loaf outline or form, transfer the sliced bread in loaf form to a wrapping mechanism, seal the wrapping, and deliver the wrapped loaf to a discharge end of the machine.

Viewed from another aspect, the invention provides a novel combination of automatic slicing and wrapping machinery in which the wrapper has a special conveyor adjustable for cooperation with automatic slicers of various speeds and adapted to pick up the sliced bread in loaf form and deliver the same in timed order to the wrapping mechanism without the necessity of any adjustment of the speed of the slicer or need for any special linking mechanism whatever.

Yet another feature of the invention resides in the fact that the bread is not touched by human hands from the time it enters the slicing machine until it leaves the wrapper in wrapped condition.

Other novel aspects of the invention both in the details of its construction and operation will appear as the following specification develops in view of the drawings, in which:

Fig. 1 is a (left) side elevation of the wrapping machine and a cooperating slicing machine;

Fig. 2 is a side elevation of the wrapping machine of Fig. 1 and viewed from the right side;

Fig. 3 is a top plan view of the wrapper and part of the slicing machine;

Fig. 4 is a horizontal sectional view of the wrapping machine, taken along the lines 4—4 of Fig. 1;

Fig. 5 is an enlarged vertical section, taken along the lines 5—5 of Fig. 3, viewing the machine from the left side;

Fig. 6 is an enlarged vertical section similar to Fig. 5 but viewing the machine from the right side;

Fig. 7 is a vertical section viewing the machine from the front, and is taken along the lines 7—7 of Fig. 6;

Fig. 8 is a perspective detail of the master control lever and control mechanism;

Fig. 9 is an enlarged operating detail showing the main drive shaft and clutch, together with a section of the control mechanism shown in Fig. 8, and taken along the lines 9—9 thereof;

Fig. 10 is an enlarged operating detail showing the clutch sprocket for the master control mechanism, and is viewed from the inner side of the machine from line 10—10 in Fig. 7;

Fig. 11 is an enlarged perspective fragment showing the juncture of the slicer with the conveyor;

Fig. 12 is a perspective fragment of the conveyor, looking upwardly at the conveyor chain and driving pawl;

Fig. 13 is an enlarged fragmentary perspective of the main and inner wrapping carriages, viewed from the top;

Fig. 13a is an operating detail of the presser bar mechanism for the paper tensioning means;

Fig. 14 is a fragmentary plan view of the heating element and lateral adjusting means therefor (lines 14—14, Fig. 13);

Fig. 15 is a schematic sectional view illustrating some of the steps of the wrapping operation;

Fig. 16 is a schematic showing of the bread being elevated against the wrapping paper;

Fig. 17 is a schematic sectional view of the bread in elevated position and partially wrapped;

Figs. 18 and 19 are also schematic views showing the final stages of the wrapping operation;

Figs. 20 to 23, inclusive, illustrate schematically the several folding steps in the wrapping operation;

Fig. 24 is a fragmentary side elevation of an automatic paper feed;

Fig. 25 is a vertical fragmentary section of the mechanism of Fig. 24 and including the cutting means;

Fig. 26 is a fragmentary front elevation partly in section, of the manual paper feed operating means, and is taken along the lines 26—26 of Fig. 24;

Fig. 27 is a vertical fragmentary detail, taken along the lines 27—27 of Fig. 26;

Fig. 28 is a top plan fragment, taken along lines 28—28 of Fig. 25;

Fig. 29 is a detail of the paper cutter, and taken along lines 29—29 of Fig. 28;

Fig. 30 is a front elevation detail of the cutting knife, taken along the lines 30—30 of Fig. 29;

Fig. 31 is an enlarged fragmentary detail partly in section of the knife mechanism, and taken along lines 31—31 of Fig. 28;

Fig. 32 is an enlarged fragmentary detail of the knife mounting, taken along lines 32—32 of Fig. 29;

Fig. 33 is a fragmentary side elevation of the automatic paper feed and driving means therefor;

Fig. 34 is a fragmentary top plan view, partially in section, of the paper roller and power drive therefor, and taken along lines 34—34 of Fig. 33; while Fig. 35 is an enlarged detail of the segmental driving gear and ratchet clutch therefor, the view being taken along lines 35—35 of Fig. 34.

By way of general preliminary description, the wrapping machine shown in Fig. 1 is used with any suitable form of slicing machine 25 having, for example, a gravity feed chute adapted to feed the bread against vertically reciprocating slicing knives and discharge the sliced bread in loaf outline at the lower end or mouth 26 of the trough or chute for transfer to intermittently operable conveyor 27, which serves to deliver the bread still in loaf form to a vertically reciprocable elevator 28 which in turn elevates the sliced loaf to the wrapping level and against a sheet of wrapping paper manually (or automatically) positioned from the stack slide 29 above the elevator, in such manner that when the elevator has reached the limit of its upward stroke the loaf will be partially wrapped, having been pressed against the paper so as to cause the latter to be folded about the top and two sides thereof. A special driving mechanism, which includes a system of cams and levers disposed for co-operation in timed relation to effect the movement of bread in steps from the receiving to the discharge end of the machine, thereafter effects the movement of a main wrapping carriage mechanism 30—88 and associated folding wings 133 so as to effect further folding of the wrapper about the bread and thereafter move the wrapped loaf between terminal fold plates 177 and thence through a heating device 179—179' to seal the wrapper.

As best shown in Figs. 6 and 7, the power unit for the wrapper includes an electric motor 31 which is preferably of the type having a self-enclosed speed reducing unit, and which is suitably secured to the main frame 24 of the machine. The drive shaft of the motor 31 is connected with a main cam or drive shaft 32, also supported by frame 24, by means of a sprocket gear 33 and a ratchet clutch 34 (Fig. 9), and a sprocket chain 35 suitably protected by an apron or shield 36 (Figs. 1, 2, and 6).

The main controls comprise a motor switch, heater-switch, and pilot-light unit 37 conveniently located on the main frame 24, and a manually operable master control lever 38 (Figs. 1 and 8).

The clutch mechanism 34 includes a ratchet gear 39, which is attached to the sprocket 33 (Figs. 7 to 10, inclusive) and rotates continually with the latter when the motor 31 is energized. The main cam or drive shaft 32 has a clutch plate 40 affixed thereto adjacent the ratchet gear 39, and pivoted on this clutch plate, as at 41, is a pawl 42 normally urged by means of a spring 43 into engagement with the ratchet 39, but adapted to be held out of latching engagement by means of a latch bar 44 which is slidable in an oblong slot 45 in a housing 46 conveniently secured on the frame 24 adjacent the bearing support of the main drive shaft 32 and the sprocket 33 thereof (as in Figs. 1 and 4 for example).

The clutch control or latch rod 44, as shown in Fig. 9, is provided with a slot 47 which in turn is engaged by the tongue 48 of a clutch operating arm 49 pivotally mounted on a clutch rod 50 between a pair of opposed brackets 51 on a wall of the housing 46. The clutch rod 50 is suitably linked with the master control lever 38 by means of the connecting rod 52, in such manner that a depression of the lever (counter clockwise, Figs. 7 and 8) will pivot the clutch rod 50 and the clutch operating arm 49 thereon so as to cause the tongue 48 of the latter in the slot 47 of the clutch bar 44 to move the clutch bar out of engagement with the end portion of the pawl 42 (to the right in Fig. 9), thus permitting the spring 43 to move the pawl 42 into latching engagement with the ratchet gear 39, whereupon the rotating sprocket gear will transfer its motion through the ratchet gear and clutch plate 40 to the main cam or drive shaft 32.

To stop the wrapping mechanism, it is merely necessary to permit the clutch bar 44 to return to the position shown in Figs. 9 and 10, in which it lies in the path of the revolving pawl 42, whereupon the end portion of the pawl will again be borne against the clutch bar 44 and disengage the ratchet wheel 39 and thus free the clutch from the driving sprocket 33.

The foregoing clutch of the drive structure constitutes one of the important features of the invention since it provides a means for smoothly controlling the intermittent operation of the conveyor and wrapping mechanism from a central drive shaft, the power means for which is constantly energized and ready for instant driving connection with the central shaft.

Attention is called to my U. S. Patent 1,951,605, for a bread slicing machine, in which is shown an automatic clutch device the operation of which is controlled by movement of bread or the like, and it is observed that the present invention contemplates the application of such a clutch control means for operating the clutch of the present mechanism, that is to say, it is contemplated that the present clutch control may be operated by the movement of sliced bread by the means shown in said patent.

The conveyor

The conveyor structure 27 and driving means is best shown by convenient reference between Figs. 4, 5, 6, 11, and 12. As seen in Fig. 4, the conveyor includes a stationary shelf or platform 53 which is secured along its longitudinal extremities to angle brackets 54, having longitudinally extensive slots 55 (Figs. 5 and 12) through which extend wing nut set screws 56 adjustably securing the conveyor brackets to supporting brackets 57, which are in turn attached to the frame 24 of the machine. As seen in Fig. 11, the outer most (left-hand) extremity of the conveyor shelf 53 is suitably spaced from an endwise cross arm 58 attached to the angle bracket 54, to adjustably receive an adjustable platform having a depending lip 59 which hooks on to the cross bracket 58 and the outer extremity of which is adapted to rest on the discharge chute 26 of the slicer.

A pair of longitudinally extensive side rails 60 are provided to guide the bread from the slicer along the conveyor and are secured for adjustment laterally of the conveyor by means of brackets 61 (Figs. 4 and 11), which have elongated slots through which extend wing nut set screws attaching the rails to brackets 62, which in turn are attached to the angle brackets 54 of the conveyor frame.

Adjacent the longitudinal extremities of the conveyor are a pair of spindles 63 rotatable in the angle brackets 54 and each having a sprocket gear 64 at their outermost extremities adjacent the brackets 54 (see also Fig. 5), the conveyor platform 53 being slotted as at 53' to accommodate the sprockets and a pair of sprocket chains 65, which are extended between the sprocket gears of each spindle on both sides of the conveyor.

It should be particularly observed in Figs. 6, 11 and 15 how the conveyor structure cooperates with the slicer to pick up the sliced loaves as they leave the slicer. In Fig. 11 the sliced loaf is shown in dotted lines in the position in which it will be just prior to having its forward long edge raised by one of the conveyor cross bars, and it will be observed that the outermost edge portion of the conveyor platform lies in the path of the advancing loaf, the latter abutting against this edge as it is pushed forwardly by the other loaves leaving the slicer. As one of the cross bars 67 approaches and bears against the bottom of the loaf, the latter is tilted into the position B in Fig. 15, and thereafter the advancing loaves from the slicer push the raised loaf forward until a following conveyor bar moves against the back of the loaf and carries it along on the platform. Meanwhile succeeding loaves are pushed forward by the slicer into position to be raised and picked up by the conveyor bars.

At suitable intervals, the conveyor chain 65 is provided with links having an offset portion 66 for engagement with cross bars 67 extended between these links on both chains, in such manner that the cross bars or conveyor bars 67 are moved longitudinally over the conveyor platform 53 to slide sliced loaves between the rails 60 from the extremity adjacent the discharge end 26 of the slicer to the extremity adjacent the elevator 28.

Novel driving means for the conveyor chains 65 are provided in the form of a reciprocating arm 68 (Figs. 6 and 12) having at its outermost or lefthand extremity a spring-urged pawl 69, positioned beneath one of the conveyor chains 65 in such manner that the pawl finger 69' thereof is engageable with the open portions of the links of the sprocket chain. The outermost or right hand extremity of the conveyor driving arm 68, as seen in Fig. 6, rests in a slot in a cross bearer 70 of the frame 24, and at its lefthand extremity as seen in Fig. 6, the driving arm 68 is pivotally connected as at 71, to an arm 72 which in turn is attached to a tandem cross arm 73, the cross arm serving to interconnect the two main carriage driving arms 110 on the outer opposite sides of the frame and pivoted at their lower extremities thereto, as at 111 (see also Fig. 4).

The arm 72 is adapted to be reciprocated by the pivotal connection of the main driving arms 110 with the outside drive plates 165 by means of a crank arm 74, the drive plates 165 being rotatable with the main drive shaft 32, and pawl 69 being adapted to slip backwardly (to the left in Fig. 6 and to the right in Fig. 12) over the conveyer chain 65, and to engage a link of the chain upon its forward movement (to the right in Fig. 6) so as to run the chains over their respective sprocket gears 64 and cause the crosswise conveyor bars 67 to bear against the bread supported between the side brackets or rails 60 and move such bread toward the elevator.

In order to adjust the conveyor for the purpose of transporting loaves of varying dimensions for proper receiving position relative to the elevator 28, it is merely necessary to loosen the wing bolts 56 (Figs. 4 and 12) and shift the entire conveyor frame longitudinally toward or away from the elevator, the result being to space the inner extremity of the conveyor shelf relative to the elevator.

The reciprocation of the conveyor driving arm 68 through its driving connection with the main cam or power shaft 32 is thus effective to cause the pawl 69 to engage the link chain 65 and move loaves of bread in intermittently timed steps toward the elevator 28, to be transferred to the latter as shown schematically by step D in Fig. 15, for elevation toward the wrapping level of the wrapping carriages to initiate the actual wrapping operation in a manner later to be described in detail.

The elevating mechanism

One of the novel features of the present invention resides in the mechanism for transferring sliced bread in loaf outline or form from the innermost extremity of the conveyor shelf 53 onto an elevator 28 (Figs. 5, 6, and 7, which serves to raise the bread against a wrapping paper in a manner to effect a partial wrapping of the loaf. The elevating means may be said to constitute an initial wrapping means.

The elevator 28 includes a vertical post or rod 28' supported for reciprocal vertical movement in a yoke-shaped elevator bracket 76 attached to the frame 24 on a cross arm 76' thereof. An elevator table 77 is supported by means of a depending boss and pin embracing the upper extremity of the elevator rod 28', and the table is provided at its sidewise extremities with a pair of end plates 78 adapted to retain the sliced bread in loaf form for its transit upwardly to the wrapping level and into the position shown, for example, in Fig. 6, or schematically in Figs. 15 and 17.

An elevator arm 79 is pivoted as at 80 (Fig. 6), to the frame 24, and has a bifurcated end portion 81 which embraces a reduced portion 82 of the elevator shaft or rod 28'. Intermediate its extremities, the elevator operating arm 79 is provided with a laterally extended cam arm 83 having at its uppermost extremity a cam rider 84 which bears against a cam 85 rotatable with the shaft 32. The cam 85 is so developed as to provide a moderately rapid rise for the upward movement of the elevator and to permit the elevator to rest momentarily in its raised position before descending somewhat more rapidly through the remainder of its travel, the momentary hesitation of the elevator being necessary to permit the cooperating instrumentalities of the wrapping carriages to remove the loaf from the table 77 and effect their subsequent wrapping operations.

Initial wrapping operation and mechanism

In the embodiments of Figs. 3, 5, and 6 for example, the wrapping paper 86 is adapted to be fed manually down a chute 87 positioned at the receiving end of the machine, the paper being supported in a pack on pegs in such manner that one sheet at a time may be torn from the pegs and fed down the arcuately-shaped chute beneath the inner folding carriage 88 and onto spaced rails 89 (Fig. 13 also) against stops 90 thereon, the space between the rails 89 being adequate to accommodate the largest dimension of loaf and representing the wrapping level to which the elevator 28 rises, so that a loaf carried on the elevator is positioned a distance equal to its height above the plane or level of the rails 89, and when the wrapping paper is positioned on the rails as aforesaid, it will be apparent that the elevator will cause the bread carried thereby to bear against such paper and tend to lift the paper a distance from the rails 89 substantially equal to the height of the loaf of bread.

The initial wrapping operation is effected by holding a positioned paper in a tautened but yielding condition over the region immediately above the upper terminal position of the elevator table 77 by means of a tautening mechanism which includes a pair of rollers 91 and 92 extended crosswise of the machine and parallel with the laterally extending edges of the elevator table 77. The roller 91 is adjustably supported on brackets 93 which are secured by means of wing bolts through elongated channels 94 in the upper parts of the frame 24 in such manner that the distance of the roller 91 relative to the roller 92, which is secured to the frame 24 but is not adjustable, may be varied to accommodate different sized loaves. The wrapping paper in its movement down the chute 87 passes beneath these rollers toward the stop 90 to rest upon the longitudinally extensive spaced rails 89 and, as shown in Figs. 5 and 6, each of the rails 89 is provided with a co-extensive presser bar 95 which is supported by a spring mechanism in longitudinal extensive edge slots 89', shown in detail in Figs. 13 and 13a, for movement toward and against the rollers 91 and 92 so as to firmly press the wrapping sheet against the lower portions of these rollers.

In Figs. 13 and 13a it will be seen that the presser bar 95 is secured at its underside to the upper extremity of a plunger 96 movable vertically within a cylinder 97 fixedly secured to the rail 89, the cylinder having an interior compression spring 98 which bears against the lower end of the cylinder and against an intermediate collar portion 99 on the rod 96 so as to urge the latter upwardly, and consequently urge the presser bar 95 in the same direction. With the spring 98 normally in extended position, the presser bar 95 will bear against the lower surface of both rollers 91 and 92 and grip any wrapping paper positioned therebetween.

In order to maintain the presser bars 95 in lowered position against the tension of springs 98 so as to permit the wrapping paper to move over rails 89 and engage stops 90, an arm 100 is pivoted as at 101 to each of the rails 89 and is also provided with a depending extension 102 engageable with an offset bracket 103 and which is secured to the lower part of the plunger rod 96. The arms 100 are interconnected by a transverse tandem bar 104 which extends across the machine beneath a supporting bail 105.

The bail 105 is extended crosswise of the machine and is movable in angular slots 106 in the side wall portions of the frame 24 by means of lever arms 164, drivingly connected with links 162 which in turn are pivoted to the frame and are reciprocated by a lateral stud portion which rides an interior cam track on the outer driving disk 165 on the right-hand side of the machine, as seen in Fig. 2 for example.

The direction of movement of the bail 105 is first upward and then horizontal, and during the upward movement pressure on the tandem bar 104 is relieved and the arms 100 are permitted to pivot upwardly under the urgence of the springs 98 in the cylinders 97, which also raise the plunger rods 96 and move the presser bars 95 against the rollers 91 and 92, thus tautening the paper for the initial wrapping movement.

It will be observed that the supporting bail 105 is angular in cross section and has a horizontal and vertical wall portion. As this bail moves through the horizontal part of its advancing motion, the horizontal surface of the bar moves under the longitudinal corner of the loaf which rests upon the elevator as the latter begins its downward descent, thus supporting one side of the elevated loaf and also serving to partially fold under one of the longitudinal edge portions of the paper which is partly folded about the raised loaf at the time the elevator begins its descent.

*Intermediate wrapping mechanism*

The elevator table 77, together with the bread load carried thereby, having been elevated to the wrapping level so as to bring the upper surface of the bread against the tautened wrapping paper in a manner to cause the latter to rise with the loaf and be partially folded about the same at the time of the terminal movement of the elevator, the intermediate wrapping mechanism comes into play and includes the main wrapping carriage 30 (best seen in Figs. 3 and 13) and an inner carriage 88, both of which reciprocate in the horizontal plane for the purpose of effecting removal of the loaf from the elevated table and effecting the intermediate folding steps, preparatory to moving the wrapped loaf toward the discharge end of the machine.

The elevator table 77 remains momentarily at the wrapping level at the terminal part of its upward stroke (Fig. 6), as explained in conjunction with the description of the cam drive mechanism therefor, and during this momentary hesitation the driving mechanism effects the movement of both the main carriage 30 and the inner carriage 88 in the same direction (left, Fig. 6).

The main carriage 30 comprises a pair of longitudinally extensive bars or runners 113, supported from brackets 114 attached to the main frame 24 above the wrapping level (see Fig. 3 particularly). Slidable on the runners 113 are the side arm portions of the main carriage including an arm 115, and an angularly disposed arm 116 on the right side of the machine, as seen in Fig. 13, and the single arm 115' (Fig. 3) on the lefthand side of the machine and corresponding to the companion arm 115. The arms 115 and 115' each have a terminal bracket portion 117 and 117' having a central bore which embraces the runners 113, the opposite (left-hand) extremities of each of the arms 115 and 115' being adjustably attached by means of bolts extended through elongated slots 118 therein, into similar sliding brackets 119 and 119' which are interconnected by means of a cross bar 120 (Fig. 3), the latter being adjustable in a direction longitudinally of the machine and toward and away from the inner folding carriage 88 by means of the bolts through the elongated slots 118, thus adjustably spacing the right-hand sliding bracket portions 117 of the carriage arms 115 and 115' from the left-hand brackets of the carriage, 119 and 119', for purposes later to be described. The forward sliding brackets 117 and 117' rotatably support a second cross arm or rod 121 in journals 122 and 122', forming part of the sliding bracket structures 117 and 117'.

The main carriage 30 is reciprocated on the runners 113 by means of the long outside driving arms 110 which are drivingly connected to the carriage by links 123 pivoted, as at 124, to the bracket portions 117 and 117'. The movement of this main carriage from its normal forward position (Fig. 5), rearwardly toward the elevator, is timed to occur during the momentary hesitation of the elevator at the end of its upward stroke, and it will be observed in Fig. 13 that the angularly-shaped carriage bracket 116 is provided with a descending horizontal surface portion 130 which serves as a cam surface for a runner on a lever arm 131 secured to a pivoted cross rod 132 which carries a pair of spaced folding wings 133, which are pivotally attached for movement about a horizontal axis to arms 134 clamped to the cross shaft 132. The folding wings 133 are maintained in a diverged position relative to one another by means of coil springs 135, which effect a yieldable connection between the arms 134 and their juncture with the wings.

At the outermost or right-hand extremity of the cross rod 132 is a small lever arm 136 from which extends a spring 137, anchored to the wall of the laterally extended side wing 138 of the main frame structure in such manner as to urge the shaft 132 and hence the extended folding wings 133 thereon in a downward direction, the cam arm 131 riding on the upper horizontal reach 116' of the bracket 116, serving to maintain the wings 133 in raised position against the tension of the spring 137, and the wings being permitted to descend when the cam arm 131 rides downwardly onto the descending cam surface 130 as the main carriage moves rearwardly or toward the wings.

The inner folding carriage includes a main bearer plate 88' having depending legs 139 at its corner portions, and these legs are provided with rollers 140 slidable in elongated slots 141 in the upper side wall portions of the frame, beneath the cross rod 132 (Figs. 5, 6, and 13), in which the carriage is adapted to be reciprocated by means of angular driving links 142 pivotally connected at one extremity, to an inner portion of one of the forward legs 139 of the carriage 88, as at 143, and at their other extremities pivoted as at 144 to a pair of long driving arms 145 on either side of the machine, and which are pivoted to the main frame 24 as at 146 (see Figs. 6 and 7 particularly). The long driving arms 145 are reciprocated by cam studs 147 riding on the interior cam tracks 148 of the cams 75, and it should be noted that the oscillatory or reciprocatory movement of both the inner folding carriage 88 and the main carriage generally indicated at 30, is governed by linkages with the main drive shaft 32 so disposed as to synchronize such movement and cause both of the carriages to move back and forth in a predetermined manner, the distance traveled by the main carriage 30, however, being slightly greater than that traveled by the inner carriage for purposes later to be set forth. It is also convenient to mention again at this juncture, that the to and fro movement of the main carriage effects a corresponding raising and lowering of the folding wings 133.

Secured to a yoke-like bracket 149 is a folding or tucking plate 150 (Fig. 13) constituting a first bottom fold and supporting means and which is supported by a pair of tandem rods 151 slidable in a bracket 152 which is secured to the inner carriage plate 88. The plate 150 extends beyond the forward edge of the carriage 88 and is movable in a direction outwardly of the carriage against the tension of compression springs 153 on the rods 151, and which are adapted to normally hold the folding plate in a position inwardly or toward the forward edge of the carriage. A pair of buffer springs 154 are also provided on the rods 153 intermediate the brackets 149 and 152, to take up the impact of the plate during its return movement toward the carriage bearer 88 under the urgence of the compressed springs 153 when the plate 150 is moved outwardly in its folding operation, shortly to be described.

A pair of relatively stationary vertically extended folding wings 155 are adjustably secured to the carriage 88, by means of set screws 156 extending into lateral slots 157 in the carriage (Figs. 3 and 13), and these wings 155 flank the centrally located supporting bracket 152 for the folding or tucking plate 150 on the carriage and are movable toward and away from the center of the carriage to accommodate varying lengths of loaf. The vertical folding wings 155 are provided with arcuate laterally extensive folding faces 158 (Fig. 13), and above the latter with horizontally extensive slightly curved folding fingers 159, the function of which will be described more particularly in connection with the actual folding operations of the machine, it being observed, however, that the fingers 159 are adapted to slide against the outer surfaces of the movable folding wings 133 during the forward movement of the carriage 88 (see Fig. 17 for example).

As shown in Figs. 3 and 7, the cross rod 120 of the main carriage 30 carries a centrally depending and pivotable latch finger 160, the function of which is conveniently described with particular reference to the aforementioned figures, and also to Fig. 13, although it is not shown in the latter. As the main carriage moves rearwardly or to the left, as seen in Fig. 3, the depending latch finger 160 rides over a latch stud 161 on the bracket 149 on the inner carriage, and upon the forward or return movement of the main carriage the overstroke of the latter causes the depending finger 160 to bear against the stud 161 and draw the folding or tucking plate 150 forwardly against the tension of the springs 153, at the time the carriage 88 reaches the end of its advance toward an elevated loaf. The disposition of the tucking plate 150 relative to the elevator table 77 is such that when the latter is in raised position and the plate 150 is drawn forward by continued retreat of the main carriage as aforesaid, the tucking plate is moved beneath the elevated loaf and also serves to fold or tuck in the vertically depending remnant of the wrapping paper, as represented in steps in Figs. 17 and 18.

Timed appropriately with the foregoing operation of the inner carriage 88 and the advancing movement of the tucking plate 150, the bail 105, which may be said to constitute a second bottom fold and supporting means and which extends crosswise of the machine, is moved forwardly in the angularly disposed slots 106 in the frame, and the horizontal and vertical surface portions of the bail fit against the elongated corner portions of the loaf on the side thereof opposite to the tucking plate 150, thus folding in the other depending remnant of the wrapper and at the same time cooperating with the tucking plate to support the loaf independently of the elevator table 77, which has begun its descent in timed relation to the forward or loaf engaging movement of both the tucking plate 150 and the bail 105.

As seen in Figs. 5, 6, and 7, the bail 105 is reciprocated by means of a pair of cam arms 162 pivoted at one extremity to the main frame, as at 163 (Fig. 7), and at their other extremities to links 164 attached to the bail 105, the cam arms 162 each having cam studs 107 which run on interior cam tracks 166 on the inside of the outer drive plates 165 on the main shaft 32.

When the carriage 88 moves forward to advance the tucking plate 150 toward the loaf and support the latter in conjunction with the simultaneously positioned bail 105 for additional support of the loaf after the elevator begins its descent, the stationary folding wings 155 serve to effect a partial fold of the vertically disposed end portions of the wrapper by engagement of the arcuate, lateral folding surfaces 158 with a portion of the vertical end folds in the manner represented in Figs. 20 and 21, the initial end fold having been made by the pivoted folding wings 133, and as the main carriage 30 continues its retreating overstroke the depending latch finger 160 is pivoted against the tension of a coil spring 167, (Fig. 7) anchored to the main frame and to the extremity of a small lever arm 167' at the left-hand extremity of the cross rod 120, for movement transiently out of engagement with the latching stud 161 on the folding plate 150, thus permitting the latter to be snapped back to its initial position relative to the carriage 88 by means of the springs 153, the released finger 160 serving to kick the loaf onto a terminal wrapping table 168 (Figs. 5, 6, and 7), which is pivtally supported at its right-hand extremity upon an unthreaded portion 170 of the main adjusting rod 169, which is extended laterally across, and is rotatably supported in, the main frame 24. The free end of the terminal wrapping table 168 terminates just to the right of the bail bar 105 in its lowered position, and rests upon portions of the main frame in proper vertical relation to the bail, so that the loaf may be moved from its temporary support on the tucking plate 150 and the bail onto the table 168 by the continued forward movement of the depending latch arm 160 after the same has disengaged the latching stud 161.

In order to assure uniform advancing movement of the loaf, the latch arm 160 is flanked at suitable distances by a pair of fixed depending pushing fingers 176, which cooperate with the central finger 160 to push the partially wrapped loaf across the terminal wrapping table as the main carriage approaches the end of its forward stroke, to effect the final wrapping operation (Figs. 3, and 17 to 19).

As the loaf is moved onto the table 168 from the tucking plate 150 and the bail 105, it is completely wrapped save for small tail folds, shown in Fig. 22, and these are finally turned in by a pair of vertical, terminal folding plates 177, each of which has an ascending arcuate track 178 (Figs. 5 and 6) opening at its lower extremity in the region adjoining the free lateral edge of the terminal folding table 168. As the loaf is kicked or moved onto the table 168, the tail folds seen in Fig. 22 ride into the ascending track 178 and are folded upwardly as the loaf continues its forward movement by the urgence of the depending fingers 160 and 176, until the tail folds reach a substantially vertical position relative to the ends of the loaf and are drawn out of the fold tracks 178, at which time the loaf has been moved to a point opposite the heater table 179 at which time the forward movement of the main carriage ceases.

At this juncture, the forward cross rod 121 is pivoted in an anti-clockwise direction, as seen in Fig. 6, by means of a cam 180 rotatable with the shaft and having a first upper cam face 181 which rides against the lower vertical edge portion of a bar 182 pivoted, as at 184, on the outer extended portion of the frame wing 138. The lower middle edge region of the bar 182 has an arcuately gauged portion 182' in which the cam surface 181 of the cam 180 rides when the main carriage moves rearwardly. The cam 180 has a tail extension 186 which bears against the side edge of a laterally extended plate 187 and pivots the cam into the dotted line position shown in Fig. 13, with the tail of the cam riding on the upper horizontal surface of the lateral extension 187, and the second cam surface 188 riding against the rearward bottom edge of the bar 182. The bar 182 is urged pivotally away from the wall 138 by an adjustable spring 185, and is pivoted against this spring when the cam 180 rides against the bar and the cam is pivoted into dotted line position (Fig. 13), the spring means 185 thereafter moving the bar away from wall 138 to assure positive engagement of the cam surface 188 with the bottom edge of the bar 182 as shown.

The effect of this movement of the cam 180 during the rearward motion of the main carriage, is to pivot the cross rod 121 in an anti-clockwise direction and move a pair of pusher fingers 183 from their substantially horizontal position, into which they are urged by a coil spring 121' on the shaft 121 and anchored thereto and to the frame journal or bracket 122' thereof, to a substantially vertical position when the carriage reaches the position corresponding to the dotted line representations of the cam 180, as seen in Fig. 13. The pusher fingers 183 move downwardly into engagement with the loaf which was pushed by the latch finger 160 and the flanking pushing fingers 176, to the forward extremity of the terminal wrapping table 168 preparatory to being moved onto the heater 179, and as the main wrapping carriage 30 continues its forward or return movement, the loaf engaged by the downwardly pivoted pushing fingers 183 is moved onto the heater table 179 beneath a presser shoe 190, which is resiliently attached by means of a spring strap 191 to a cross member 192 extended between the carriage brackets 114, the shoe serving to press the wrapped loaf firmly against the main heater table 179 so that the bottom sides of the commonly used waxed wrapper may be sealed.

The cross arm 192 may be raised and lowered in a vertical direction by means of the cranks 193 which are threaded into the carriage support brackets 114 on both sides of the frame, and in this way the tension of the shoe 190 upon the loaves as they pass therebeneath onto and off of the terminal folding table 168 and the heater 179, may be adjusted.

The end folds of the wrapped loaf are likewise sealed simultaneously with the bottom portions by means of a pair of end heater plates 179' (Figs. 3, 5, and 7), and which are resiliently attached to brackets 194 movable toward and away from the central shoe 190 by means of threaded engagement with the laterally extensive adjusting shaft 169 (Fig. 7 especially), the threading of which is reversed on the opposite sides of its central portion embraced by the tail of the terminal wrapping table 168, such that by revolution of the crank 171 on this shaft the reverse threading will move the supporting brackets 194 correspondingly away from or toward the center of the heating table 179.

After the forward pusher arms 183 have moved a wrapped loaf onto the main heating table 179 and between the yielding vertical heater plates 179', subsequent loaves act to push the loaf on the heater table off onto the delivery rack 195 and between a pair of side rails 196 thereon. These rails 196 are likewise adjustable laterally of the path of travel of the bread, and are connected at their innermost extremities 197 with the end heater supports 194 and at their outermost portions with movable brackets 198 threaded onto a second lateral adjusting shaft 174. The second adjusting rod 174 has a sprocket gear 175 at its right-hand extremity, as seen in Fig. 3, and is connected with the main lateral adjusting shaft 169 for conjoint rotation therewith by means of a sprocket chain 173, which passes over a sprocket gear 172 on the main shaft. Thus a rotation of the handle 171 will effect a separating or converging of the upright heater plates 179' by means of its threaded engagement with the supports 194, and will likewise effect the corresponding movement of the brackets 198 and the side rails 196 through the chain drive 173.

*Mechanical paper feed*

In Figs. 24 to 31 is shown a modified form of paper advancing and cutting mechanism which comprises, as seen in Fig. 24, a pair of substantially triangularly-shaped upright brackets 200 attached to the main frame 24 of the wrapping machine on either side thereof, at a point adjacent the juncture of the manual feed chute 87 with the frame, the chute 87, of course, being removed when the automatic or semi-automatic form of feed is used.

A pair of paper rolls 201 are supported on rollers 202, which are cradled in slots 203 cast in the upper corner portions of the frame 200. The paper webs 204 may both be fed over an idling roller 205 journaled between the brackets 200 and thence between a master feeding roller 206, and presser rollers 207 likewise journaled between the brackets 200 (Fig. 25). The presser rollers 207, however, are provided with an eccentric journal 208 pivotally supported on the brackets 200 and provided with a handle portion 209 and a set screw 210, by means of which the several rollers 207 may be pivoted toward and away from the master feed roller 206 and locked in a desired position.

The presser rollers 207 are spaced apart suitably and extend into a plurality of edgewise slots 211 (Fig. 26) formed in a feeding apron 212 which is anchored at its rearward or left-hand extremity as seen in Fig. 25, to a cross member 213 and which extends arcuately downward beneath the knife supporting bracket 214 to a point confronting the rearmost edge of the stationary cutting knife 215 (Figs. 25, 29, and 31).

The master feed roller 206 is provided with a gear 216 which meshes with a driving gear 217 rotatable by a reciprocably operable crank 218 journaled in one of the brackets 200, and having an offset arm 219 which is adapted to abut against a movement limiting pin 220 movable in an arcuate slot 221 provided in the frame 200. The pin 220 may comprise two threaded portions so that it may be clamped or screwed into position in the arcuate slot and thus stop the movement of the crank 218 at any desired position. In this way the distance which the master roller 206 is rotated determines the length of paper which will be fed from the rolls 201.

The fragmentary elevation shown in Fig. 27 illustrates the crank mechanism on the inner side of the main bracket 200 and includes a ratchet 222 on the crank spindle, and a pair of spring-urged pawls 223 engageable with the ratchet and which permit the initial movement of the crank 218 in an anti-clockwise direction, but which effect a driving engagement with the gear 217 when the crank is returned in a clockwise direction (Fig. 24) for each feeding operation.

The knife supporting structure includes a yoke-shaped frame 224 (Figs. 28 and 29) and the left-hand free ends of which are pivotally mounted, as at 225, to a cross bearer bracket 226 which extends between the upright sides of the main supporting brackets 200, and which is engaged at its outermost extremities by a set screw 227 slidable in an elongated slot 228 in the support 200. A front bearer 229 is joined with the rear bearer 226 by longitudinally extensive straps 230 (Fig. 29). The front bearer 229 is slidably supported at its ends on shelves 112 formed in frame 24 and engages the offset end portions 231 of the elongated rails 232 (Figs. 28 and 31) which are secured to the main longitudinal rails 89 inside of the main frame, by means of set screws 233 extending through longitudinal slots 234 in the supporting rails 232. The upturned end portions 231' of the supporting rails 232 fit into slots in the front cross bearer 229.

In order to adjust the position of the knife carrier, it is simply necessary to loosen the set screws 227 (Figs. 28 and 32) and the screws 233, whereupon the rear and front bearers 226 and 229, together with the supporting rails 232, may be moved forwardly or backwardly to any desired position.

The front cross bar of the knife frame 224, as seen in Figs. 28 to 31, is provided with a plurality of spaced, extending bosses 235, the outermost ones of which are provided with a slot in which are seated rollers 236 engageable by cam fingers 237 (as in Figs. 25 and 31) extended from the rear of the inner folding carriage 88 when the latter is moving through the backward portion of its travel.

The centrally located extended bosses 235' are provided with set screws 238 which serve to urge tension springs 239 against the movable knife elements 240 against the laterally extensive cutting edge of the stationary knives 215, it being observed that the movable knives 240 are two in number (Fig. 30), being separated from one another at substantially the midpoint of the frame, and being pivotally attached to the latter by means of hinges 241. It will be observed that the cutting edge of the knives is relieved inwardly from the outermost extremities of the blade toward the centers thereof, for the purpose of providing an advancing cut across the sheet as the knife frame descends.

The outermost bosses 235' are provided with a vertical spring well 242 in which are seated springs 243, seated on screw studs 244 extending through the stationary knives 215. These springs serve to return the knife frame to its raised position after each cutting operation.

In Fig. 28 (and also Figs. 29 to 31), it will be observed that an intermediate paper support is provided between rail parts 231—232 for the sheet of wrapping paper, and this support takes the form of an extensible pan or apron which includes a bracket 260 having a lower offset edge part 261 (Fig. 31) which bends down below the bottom of the front bearer 229 of the knife frame, and is secured to the latter by means such as the screws 264. The upper part 261 of this apron structure overlies a frame cross arm 265 and has adjacent its right-hand end, as seen in Fig. 31, an extensible part 262 (see also Fig. 30) slidably supported on opposite flange members 263 screwed or otherwise attached to the bottom of the main bracket part 260.

All of the paper feed chutes and aprons are provided with longitudinally extensive ribs 87' (chute 87 in Fig. 13), and 212' (on the apron 212, Figs. 26, 28). By this means friction resistance to the movement of the paper is reduced and at the same time the paper is stiffened for more efficient feeding and positioning.

In order to prevent slippage of the wrapping paper, which is frequently a waxed paper, between the master feed roller 206 and the presser rollers 207, the latter are driven with and by the master roller 206 by means of gear teeth 217ª which mesh with teeth 216ª provided on the presser roller shaft at the right-hand interior side of the paper roll frame 200, as seen in Fig. 25. In this manner when the master roller 206 is turned by the crank 218 or other means, the presser rollers 207 rotate therewith through the medium of the meshed gearing 216ª—217ª, thus assuring a positive feeding movement of the paper web.

In both types of mechanical paper feed, suitable tensioning means are contemplated whereby the tension on the paper web may be adjusted variously to assure smooth and accurate operation of the feed mechanism.

*Automatic paper feed*

It may be found desirable to have the wrapping paper fed automatically, in which case the mechanism shown in Figs. 33 to 35 may be substituted for the semi-automatic and manually powered paper feed shown for example in Figs. 24 and 25.

Referring to Fig. 33, the supporting frames 200' for the paper rolls are substantially the same as the frames or standards 200 used in conjunction with the manually powered feed, and the mechanism is provided with an idling roller 205', a master roller 206', and a plurality of spaced presser rollers 207', as in the embodiment of Fig. 24, but whereas the driving gears in the latter embodiment are positioned at the left-hand inner side of the frame as viewed in Fig. 24, the power-operated driving gears in the automatic type are disposed at the right-hand side of the machine.

In the automatic device the master roller 206' is provided with a driven gear 300 positioned on the outer side of the bracket or standard 200', and meshing with an intermediate gear 302 pivoted on a stud 303 extended from the frame. The stud 303 in turn is provided with a gear 305 engageable with a segmental gear 304 also pivoted on the outer face of the standard, as at 306, and having an extended arc portion 308 which is pivotally connected, as at 310, to a feed-drive arm 312, the reciprocation of which is adapted to rotate the master roller 206' in one direction through a ratchet clutch mechanism interposed between the driven gear 300 and the roller shaft 301 (Fig. 35).

The feed-drive arm 312 is reciprocated by a crank arm 314 journaled in the machine frame 24, and having an adjustable pivotal connection with the arm 312 by set screw means 316 slidable in a radial slot 317 in the crank arm, with an adjustable stop screw 317' threaded into the end of the arm 314 to adjust the length of stroke of arm 312 in slot 317, whereby the stroke of the feed arm 312 may be adjusted so as to feed various lengths of paper. Crank arm 314 is provided with a sprocket gear 318 over which passes a sprocket chain 320 driven by a sprocket gear 322 on the main drive shaft 32 behind the right-hand outer drive plate 165.

The ratchet clutch shown in Fig. 35 includes a plate 307 rotatable with the driven gear 300 on the shaft 301, independently of the roller 206'. The inner side of this plate is provided with a pair of spring-urged pawls 309, which are normally urged into engagement with a ratchet gear 311 flanked by a plate 313 (Fig. 34) and rotatable with the shaft 301 in such manner that the reciprocable motion of the segmental gear 304 transmitted through the gears 305—302—300 to the clutch plate 307 will cause the pawls 309 to carry the ratchet 311 with them when they move in one direction, the pawls slipping backwardly over the ratchet teeth as the gear segment moves in the opposite direction.

The master roller is also provided with a gear 217ᵇ adjacent the inner face of the paper roll standard, this gear being meshed with gearing 216ᵇ on the presser roller shaft so as to provide for a conjoint rotation of the master and presser rollers to prevent slippage of the paper.

In other respects, the operation of the paper feed in conjunction with the automatic cutter is the same as described in conjunction with the device of Figs. 24 to 32 and hereinafter described in detail under the statement of operation.

*Detailed statement of operation*

Assuming that the manual paper feed of Fig. 1 is used, the machine may be set into operation by energizing the driving motor 31 by the switches on the control panel 37. It will further be assumed that a plurality of loaves of bread are being fed into the automatic slicer 25 and being discharged from the same over the discharge trough 26 thereof and onto the conveyor 27 of the wrapper. At this stage, the loaves A and C are indicated in Figs. 1 and 15 as moving onto the conveyor.

The operator will then remove a wrapping paper from the stack 29 and slide the same down the chute 87 until the paper abuts the stopping pins 90 on the longitudinal rails 89 (Figs. 5 and 13) and thereafter may depress the master control lever 38, which will serve to pivot the clutch rod 50 and the lever arm 49 thereon, so as to move the clutch bar 44 away from the end of the clutch pawl 42 and permit the latter to move under the urgence of spring 43 into engagement with the constantly rotating ratchet gear 39 movable with the main driving sprocket 33 (Figs. 7 to 10).

The clutch plate 40 secured to the main drive shaft 32 will then rotate the latter, and the several parts of the wrapping and conveying mechanism will be actuated in timed relation to effect the following operations.

As seen in Figs. 4 and 6, the long, outermost driving arms 110 will be reciprocated by the crank links 74 which are attached to the outermost driving plates 165, and the cross or tandem bar 73 interconnecting the two drive arms 110 will effect a reciprocatory movement of the conveyor pawl 68 through the link connection of the latter with the smaller drive arm 72 secured to the tandem bar (Fig. 4).

As the conveyor driving arm 68 reciprocates (from the position shown in Fig. 1 to the left as seen in Fig. 6) the pawl 69 will engage the open portion of one of the conveyor chains 65, and move the latter in an anti-clockwise direction upon the forward movement of the arm 68 so as to cause the several conveyor bars 67, connected at their extremities to each of the conveyor chains 65, to be stepped across and around the conveyor platform 53 so as to move the loaf indicated at C in Fig. 15, toward the elevator after the same has been pushed onto the table 53 by the loaf A which is being conveyed from the slicer.

The movement of the driving arm 68 being reciprocatory, it will be apparent that the loaf of sliced bread, which is maintained in loaf outline by the side rails 60 on the conveyor, will be moved in steps toward the reciprocably moved elevator in a definitely timed relation thereto and in such manner that when the loaf reaches the innermost end of the conveyor platform, the elevator 28 and the table 77 thereof will be in position to receive the loaf between the side wing portions 78 of the table 77.

At this juncture, the main cam 85 (Fig. 5) will present its rising track to the cam arm and rider 83 and cause the elevator arm 79 to move upwardly, which results in the upward movement of the elevator shaft 28' through its engagement with the bifurcated end portion 87 of the elevator arm.

The wrapping paper having been previously positioned above the elevator and the open area through which the loaf carried by the same will issue, the bail 105 will (Fig. 13) begin its upward movement through its connection with the lever arms 164 and 162 (Fig. 7), and the reciprocatory movement of the latter effected by the cam stud 107 thereon, which rides along the inner cam track 166 on the outer drive plates 165. As the bail 105 moves upwardly, pressure is removed from the cross bar 104 and hence from the pivoted arm 100 attached to the same, so that the depending finger 102 of arm 100 is raised from the offset extension 103 on the presser plunger 96.

As seen in Fig. 13a, the spring 98 in the cylinder 97 will bear against the collar 99 on the rod 96 and effect an upward movement of the latter, and therefore of the horizontal presser bar 95 to which it is attached. As a result, the positioned wrapping paper is yieldably urged against the crosswise rollers 91 and 92, and when the elevator approaches the end of its upward stroke the loaf indicated at E in Fig. 17 will bear against the paper and carry the same upwardly with it, the tautening pressure of the presser bar, however, causing the paper to be folded down upon the vertical side walls of the loaf and thus effecting a partial wrapping of the bread.

Prior to the movement of the elevator into its upper terminal position, the main carriage 30 moves inwardly, that is, toward the left (Figs. 3, 5 and 17) so as to cause the depending latch finger 160 to engage the latch stud 161 on the tucking plate 150, it being remembered that the main carriage moves faster than the other carriage 88 (the carriages in this sense being movable toward and away from each other), this movement being such that when the two carriages start back toward the right, the faster carriage urges the latch arm 160 against the latch stud so as to pull the tucking plate in advance of its carriage to tension the coil springs 153 with the result that the tucking plate is projected beneath the loaf before the carriage 30 completes its retreating movement (to the right). Meanwhile, the upright folding wings 155 on the carriage 88 will have moved across the ends of the loaf to effect end folds and project the fingers 159 against the wings 133 to pivot the latter inwardly and effect additional end folds.

The elevator table 77, with the initially wrapped loaf thereon, will remain momentarily at the wrapping level, the inner carriage 88 and the main carriage 30 having previously shifted toward the left-hand end of the machine (looking at Fig. 5) and started back toward the right end of the machine with the carriage 88 approaching the loaf as shown in Fig. 17, whereupon the cam arm 131 on shaft 132 will ride down the descending cam surface 130 on the angular arm 116 on the main carriage, thus pivoting the pair of folding fins or wings 133 downwardly in substantially confronting relation, with the ends of the loaf and beginning a partial downward fold of the projecting ends of the wrapper as indicated by step E in Figs. 17 and 20. The intermediate folding operations effected by the carriages and wings is substantially completed by movement of the carriage 88 close to the loaf as illustrated in Fig. 8.

Meanwhile, the elevator 28 has begun its downward descent preparatory to receiving another loaf from the conveyor, and the partially wrapped loaf just described is supported in elevated position by the underlying folding plate 150, which has served also to tuck one of the vertically depending remnants of the long side of the wrapper against the bottom of the loaf as a result of the pulling forward of this plate by the return of the main carriage and the engagement of the depending latch finger 160 with the stud 161. The other long side of the bread is supported in the angularly-shaped bail 105 which, at the time the elevator begins its descent, is positioned oppositely to the plate 150, and also effects a tucking in of the vertical remnant of the wrapper on the long side of the loaf opposite to that folded by the tucking plate 150 (Fig. 18).

As the inner carriage 88 completes its forward retreating movement, the arcuate folding surface 158 on the stationary end-folding wings 155 serves to fold in one of the two vertical folds extending from both ends of the loaf, as shown by step F in Fig. 21. By the time the main carriage approaches the limit of its return or retreating movement, the cam arm 132 will again run onto the upper horizontal reach 116' of the angled main carriage arm and pivot the movable folding wings 131 back to normal position, as shown in Fig. 13.

Meanwhile, the depending latch finger 160 on the main carriage cross shaft 120 will have slipped out of latching engagement with the stud 161 on the tucking plate 150, and the latter will snap back to its normal position under urgence of the previously compressed springs 153. The result of this is to cause the depending finger 160 likewise to be snapped against the side of the loaf previously resting on the tucking tray 150 and the bail 105, both of which are now removed from beneath the loaf so that the latter will be kicked onto the terminal folding table 168 with the assistance of the similarly moving arms 176 on the shaft 120 (Fig. 19).

As the loaf moves onto the terminal wrapping table 168, there remain two end folds such as shown in Figs. 21 and 22, one in a vertical plane and one in a horizontal plane, the latter being termed the tail fold. The vertical fold impinges against the curved vertical end portion of the spaced terminal folding plates 177, so that the wrapping is in the condition shown in Fig. 22, while the horizontal or tail fold shown in this figure subsequently moves into the ascending folding track 178, and as the loaf moves forwardly this tail fold is gradually moved upwardly until it slides out of the folding track, at which time the loaf is riding beneath the shoe 191 preparatory to moving onto the main heater table 179.

Upon the return of the main carriage to its normal forward position, the pivoted cross arm 121 will be returned to its normal position under the urgence of the coil spring 121', which has previously been energized by the movement of the cam 180 (Fig. 13) under the cam bar 182 and the second pivoting of the shaft 121 as the tail 186 of the cam bears against the lateral plate 187. This rotation of the rod 121 upon the return of the main carriage causes the pusher fingers 183 to be pivoted downwardly against the vertical sides of the waiting loaf (Fig. 17), and moves the latter onto the main heating table 179 between the yielding vertical end heater plates 179' where the wax-treated paper will be sealed, the loaf thereafter being moved from the heater onto the delivery rack 195 by the pressure of following loaves (Fig. 19).

The entire wrapping mechanism may be manually operated for purposes of adjustment or the like, by means of a crank 250 (Fig. 7), which is slidable against the pressure of a spring 251 into its main frame journal so as to cause a gear 252 carried on the spindle of the crank to mesh with the gear portion of the left-hand (as seen in Fig. 7) drive plate 165 which, as mentioned before, is rotatable with the main drive shaft 32.

Where the mechanical paper feeding mechanism is employed, the feed chute 87 is removed and the structure explained in view of Figs. 24 to 32 replaces the chute.

The operator has merely to rotate the crank 218 in an anti-clockwise direction, having previously set the pin 220 to determine the length of stroke or amount of paper to be fed, and then return the crank in the opposite or clockwise direction so as to rotate the gear 217 through the medium of the ratchet mechanism 222—223 (Figs. 24 and 27). The result of this operation is to rotate the master rollers 206 and feed a portion of the paper web (two thicknesses being optionally used in the embodiment shown) downwardly into the apron 212, and thence beneath the knife carrying frame 214 and above the point of issue of the elevator 28.

Meanwhile, it may be assumed that the machine has been set into wrapping operation by the master control lever 38, and that the inner carriage 88 moves backwardly before the folding operation and causes the cam fingers 237 thereon (Fig. 25) to ride onto the rollers 236 on the frame 224, thus pivoting the latter downwardly against the tension of the return springs 243 (Fig. 31). In this manner the movable knife member 240 will bear against the paper sheet and against the stationary knife member 215 and shear the paper, whereupon the carriage 88 having again moved forward will permit the knife to rise ready for the next cutting operation, which will be a repetition of the foregoing procedure.

Where the automatic paper feed is used, it will be apparent that the operation of the automatic paper cutter will be the same as described in conjunction with the operation of the manually powered feeding means. The power takeoff and driving mechanism including the drive arm 312, the segmental gear 304, and the driven gear 300 being engineered to feed a desired length of paper into wrapping position over the elevator in timed relation with the other movements of the wrapping mechanism, including the conveyor, the elevator, and the wrapping carriages.

The invention shown and described in the preferred embodiment herein, is not intended to be limited to any of the precise details recited, but is to be broadly and fairly defined within the scope of the appended claims.

Having thus described my invention, what I claim as new and desire to protect by Letters Patent is:

1. In a bread wrapping machine having driving mechanism and means for holding and moving a loaf of bread against a wrapper to effect a partial wrapping of the same, folding mechanism comprising a pair of carriages supported for reciprocable movement toward and away from a held loaf partially wrapped as aforesaid, a first one of said carriage members having a part movable under the bottom of the loaf for partial support of the same and effective to fold a portion of the wrapper onto said bottom, said first carriage member further having a pair of spaced upstanding plates movable across the end portions of the loaf and adapted to effect a partial folding of the wrapper at such end portions, a pair of end-fold wings supported for pivotal movement from raised position in a direction downwardly across the ends of said loaf to effect a further partial fold of said wrapper at said end portions, a pair of spaced upstanding terminal fold plates each having open-ended upwardly-directed fold tracks for receiving and folding-in endwise extending folds of said loaf when the latter is moved therebetween, and means on said second carriage for moving said loaf away from said first carriage and between said terminal fold plates to fold in endwise extending remnants of said wrapper as aforesaid, the said second carriage further having means operable to pivot said end fold wings into folding position upon movement of the second carriage in the direction toward said first carriage, together with means drivingly connecting the said reciprocable carriages with said driving mechanism.

2. In a bread wrapping machine having a driving mechanism, paper supporting and tautening means including spaced horizontal paper-supporting rails, paper-positioning means on said rails, roller means supported above and across said rails and above the paper supported thereon, the rails having presser bar means movable upwardly away therefrom toward said roller means, and supporting means for said presser bar means and including a sleeve member attached to a said rail, a plunger extended through said sleeve and movable therein, the upper end of said plunger being secured to a presser bar and the lower end of said plunger having a member engageable by a reciprocable operating arm actuated by said driving mechanism and adapted to intermittently urge said plunger and presser bar away from said roller means, the said sleeve having yieldable means normally urging said plunger upwardly in a direction to move said presser bar toward said roller means and arranged to press wrapping paper against the same when said reciprocable operating arm is not urging said plunger away from the roller means.

3. In a bread wrapping machine, paper supporting and tautening mechanism comprising spaced horizontal paper supporting rails, positioning means on said rails, roller means above said rails and above the paper supported thereon, and means for pressing said paper against said roller means and comprising presser bars movable from a point at or below said rails against said paper and toward said roller means to urge the paper thereagainst, supporting means for said presser bars including a sleeve attached to a said rail, a plunger reciprocable in said sleeve, yieldable means normally urging said plunger out of said sleeve and toward said roller means, said presser bar being attached to a said plunger for movement therewith toward said roller means, and means cooperable with the mechanism of said wrapping machine for intermittently moving said plunger in a direction away from said roller means and against the urgence of said yieldable means.

4. A bread wrapping machine including movable holding means adapted to hold bread in loaf form, means arranged to yieldably hold a wrapper in the path of movement of said holding means such that bread held by the latter may be moved against said wrapper to cause the same to be partially folded about the bread, means including fold members reciprocably movable relative to the end and bottom portions of said partially wrapped bread for effecting further partial folding of the wrapper thereabout, terminal folding means including a pair of upright spaced plates each having an open-ended arcuate slot for receiving extending end folds of the partially wrapped loaf, and means cooperating with said fold members for moving the partially wrapped loaf between said folding plates and cause remaining unfolded end portions of said wrapper to ride in said arcuate slots and effect a folding-in of said wrapper portitons toward the ends of the loaf by movement of the latter between said folding plates, together with driving means operably associated with said movable holding means and with said reciprocable fold members to advance a loaf of bread toward said wrapper and the several reciprocable fold members, reciprocate the same in folding operation, and thereafter move said loaf between and past said folding plates in the manner aforesaid.

5. In a bread wrapping machine, initial and intermediate wrapping means including a reciprocable loaf elevator arranged to effect partial wrapping of a loaf by elevating the same against a wrapper, a pair of reciprocable carriages substantially opposite the upper terminal of said elevator and arranged for movement in a direction toward and away from and relative to each other a loaf on the elevator, a first bottom supporting means movably mounted on a first one of said carriages, means actuated by said second carriage when the latter is moved in a predetermined manner relative to said first carriage for effecting movement of said first bottom supporting means beneath said loaf, a second bottom supporting means arranged for reciprocation opposite said first supporting means and moved beneath said loaf substantially in timed relation to similar movement of said first bottom supporting means whereby said supporting means will support said loaf independently of said elevator and effect bottom folds of said wrapper, and driving connections for moving said elevator, carriages and said second bottom supporting means in timed relatiton substantially as and for the purpose aforesaid.

6. In a bread wrapping machine of the type having elevating means for moving a loaf against a wrapper into a predetermined position to partially wrap the loaf, intermediate folding mechanism comprising: a pair of reciprocable carriages movable toward and away from a loaf at said position, end folding means on said first carriage, a first bottom folding and supporting member movably mounted on said first carriage, a second bottom folding and supporting member arranged for movement back and forth opposite said first carriage beneath said loaf for supporting engagement therewith and to effect a bottom fold thereon, pivoted end fold wings yieldingly held away from the ends of said loaf and movable in a direction across as well as toward said ends to effect end folds thereon, the second one of said carriages being arranged for movement to pivot said end wings in a direction across said ends, means movable by said first carriage for pivoting said wings toward said ends subsequent to movement thereof across the ends, and means moved by said second carriage transiently into and out of operative engagement with said first bottom folding member to move the latter beneath said loaf to effect a bottom fold and to support said loaf in said position independently of said elevator in cooperation with said second bottom folding and supporting member, and driving connections for actuating said elevating means, said carriages, and said second bottom supporting member in predetermined timed relative movements for elevating a loaf, and moving said carriages to support said loaf at said position independently of said elevator and effect said bottom and end folds.

7. In a bread wrapping machine of the type having elevating means for moving a loaf against a wrapper into a predetermined position to partially wrap the loaf, intermediate folding mechanism comprising: a pair of reciprocable carriages movable toward and away from a loaf at said position, end folding means on said first carriage, a first bottom folding and supporting member movably mounted on said first carriage, a second bottom folding and supporting member arranged for movement back and forth opposite said first carriage beneath said loaf for supporting engagement therewith and to effect a bottom fold thereon, pivoted end fold wings yieldingly held away from the ends of said loaf and movable in a direction across as well as toward said ends to effect end folds thereon, the second one of said carriages being arranged for movement to pivot said end wings in a direction across said ends, means movable by said first carriage for pivoting said wings toward said ends subsequent to movement thereof across the ends, and means moved by said second carriage transiently into and out of operative engagement with said first bottom folding member to move the latter beneath said loaf to effect a bottom fold and to support said loaf in said position independently of said elevator in cooperation with said second bottom folding and supporting member, said transiently moved means being arranged to remove said loaf from said position following transient disengagement of said means from said first bottom folding and supporting means, and driving connections for actuating said elevating means, said carriages, and said second bottom supporting member in predetermined timed relative movements for elevating a loaf, and moving said carriages to support said loaf at said position independently of said elevator and effect said bottom and end folds and remove said loaf.

8. In a bread wrapping machine, intermediate fold mechanism for effecting end folds on a partially wrapped loaf, said mechanism including a pair of end fold wings arranged for pivotal movement about two axes near opposite ends of said loaf, a reciprocable folding carriage arranged for movement toward and away from a side of said loaf between said ends thereof, drive mechanism and means operable thereby to pivot said end fold wings about a first one of their respective axes to move said wings substantially opposite the ends of said loaf, said drive mechanism being arranged to effect subsequent movement of said carriage toward said loaf, spaced end fold members on said carriage and means moved by said carriage in advance of said spaced end fold members for engaging each of said pivoted end fold wings and pivoting the latter about their other axes toward said ends of the loaf to effect end folds when said carriage is moved toward said loaf, said spaced end fold members on the carriage subsequently effecting additional end folds, and spring means arranged to pivot each of said end fold wings about said other axes away from said loaf.

9. In a device of the class described, intermediate wrapping mechanism including a pair of carriages mounted for reciprocation in the same direction one opposite the other, a reciprocable tucking plate on a first one of said carriages, a depending latch member on the other carriages, a bail arranged for back and forth movement opposite said tucking plate, means for moving said carriages in a particular direction to effect movement of said latch member into operative engagement with said tucking plate, means for moving said carriages in an opposite direction to dispose said tucking plate beneath said partly wrapped loaf to further partly wrap the same and support the loaf at one side, means for moving said bail into supporting engagement with an opposite side of the loaf, said first carriage stopping after movement a predetermined amount in said opposite direction and said second carriage continuing movement in said opposite direction whereby to operatively disengage said latch member from said tucking plate, means for quickly withdrawing said tucking plate toward said first carriage when the plate is disengaged as aforesaid, and means urging said latch member in said opposite direction against said loaf to move the latter in said opposite direction for engagement with other wrapping means, said bail being disengaged from said loaf prior to said movement of the loaf by the latch member.

10. In a bread wrapping machine, a reciprocable loaf elevator arranged to effect partial wrapping of a loaf by elevating the same against a wrapper, a pair of reciprocable carriages arranged for movement in tandem relation to each other and toward and away from an elevated loaf, a first bottom supporting means movably mounted on a first one of said carriages, means on the second carriage arranged to effect automatic operative connection with said first bottom supporting means by relative movement of said carriages in a predetermined manner, said carriages thereafter being moved relatively such that said second carriage effects movement of said first bottom supporting means beneath said loaf to effect a bottom fold, said second bottom supporting means being moved beneath an opposite portion of the loaf to effect a bottom fold and to support said loaf in cooperation with said first bottom supporting means independently of said elevator, and driving connections for moving said elevator, carriages and said second bottom supporting means in timed relation substantially as and for the purpose aforesaid.

11. In a bread wrapping machine, initial means for partially wrapping a loaf and disposing the same in a particular position, a folding carriage arranged for reciprocation opposite said position, means on said carriage for effecting partial end folds when the carriage is moved toward said loaf, movable bottom folding means on said carriage, a pair of pivoted end folding wings mounted for movement in a direction across as well as toward the ends of said loaf and means yieldingly maintaining said wings away from the loaf, a second carriage arranged for reciprocation opposite said first carriage and cooperable with the latter to move said bottom folding means and effect a bottom fold, and means arranged for coaction with said second carriage to actuate said end fold wings to effect partial end folds, and driving connections for effecting operation of said initial means, and said carriages in timed relation to effect bottom and end folds as aforesaid on said partly wrapped loaf.

12. In a bread wrapping machine, initial wrapping means for partially wrapping a loaf and disposing the same in a particular position, and cooperating intermediate folding means including: a folding carrier arranged for reciprocation opposite said position, a first bottom folding and supporting means arranged for movement toward and away from said loaf on the side thereof opposite said carriage, end folding means on said carriage and operable by movement of the carriage toward said loaf, a second bottom folding and supporting means movably mounted on said carriage, a pair of end folding wings arranged for movement from an initial position across and toward the ends of the loaf to effect end folds thereon, means for returning the wings to said initial position, a second carriage arranged for reciprocation opposite said first carriage and having operative connection with said end folding wings for actuating the same responsive to reciprocation of said second carriage, said second carriage having means operable thereby for effecting transient connection with said second bottom folding and supporting means to actuate the same for timed operation with said first bottom folding and supporting means to make bottom folds and support said loaf in said particular position independent of said initial wrapping means, and driving connections arranged to effect operation of said initial wrapping means, said first bottom folding and supporting means, and said carriage in timed relation to effect the initial, bottom and end folds aforesaid, and means actuated by said second carriage for moving said loaf away from said particular position when the aforesaid folds are completed.

13. In a bread wrapping machine, intermediate folding means including a pair of carriages mounted for reciprocation in a tandem relation, means for disposing a partly wrapped loaf in a particular position in the path of a first one of the carriages between said pair, a movable tucking member and spaced end folding members on said first carriage and moved by the latter toward said loaf to effect bottom and end folds thereon, and means on the second one of said carriages arranged and constructed to be positioned, by movement of the latter in the same direction as said first carriage, on that side of the positioned loaf nearest said first carriage and moved against said loaf to push the latter away from the first carriage and out of said particular position when said carriages are moved a certain distance in the opposite direction.

14. In a bread wrapping machine, reciprocable loaf moving means for moving a loaf against a wrapping sheet and into a particular position to partly wrap the loaf, a first folding carriage arranged for reciprocation opposite said particular position, a tucking plate yieldingly mounted on said carriage, movable supporting means arranged to be projected beneath the side of said loaf opposite said first carriage to effect a bottom fold and partly support said loaf, end folding members on said carriage and moved closely past the ends of the positioned loaf to effect partial end folds upon movement of said carriage close to said loaf, pivoted end fold wings arranged to move back and forth in a direction closely past and toward the ends of the loaf to effect partial end folds, spring means normally disposing said wings away from the ends of the loaf, a second carriage arranged for reciprocation opposite said first carriage and cooperable with said end fold wings for movement to actuate the latter to effect folding operation of the same when said first carriage is moved toward said loaf, terminal wrapping means on the side of said second carriage away from said first carriage, depending finger means moved by said second carriage into position on that side of said positioned loaf nearest said first carriage for operative connection with said tucking plate prior to movement of said loaf into said predetermined position and arranged for movement by said second carriage to move said tucking plate beneath the loaf whereby to effect a bottom fold and support said loaf in cooperation with said movable supporting means free from said loaf moving means, said finger means thereafter disengaging said tucking plate and moving said loaf away from said particular position and toward said terminal wrapping means, and driving connections for actuating said loaf moving means, said carriages and said supporting means in predetermined timed relation as and for the purpose aforesaid.

15. In a bread wrapping machine including a power-driven operating means, paper supporting and tautening mechanism comprising spaced means arranged to support a sheet of wrapping paper in a predetermined position in a substantially horizontal plane, collaterally extended spaced paper engaging members arranged above the plane of said wrapping paper, and spaced pressing means arranged transversely of said collaterally extended engaging members for movement toward the latter from a normal position below said sheet of paper to press the same against the pressing means, spring means normally urging said pressing means in the direction of pressing movement toward said collaterally extended paper engaging members, and mechanism cooperably driven with the power means of said bread wrapping machine normally urging said pressing means into position away from said collaterally extended paper engaging members and operable periodically to release the latter for pressing movement by said spring means in timed relationship to the wrapping operation of said machine.

16. In a wrapping machine, mechanism for partially wrapping an article so as to leave portions of a wrapper extending from opposite ends of the article and depending from opposite sides thereof, and means for effecting further wrapping of said article and including a reciprocable member arranged to move toward and away from the article partially wrapped as aforesaid, means moved by said reciprocable member against a depending portion of said wrapper to fold the same beneath said article, means also moved by said reciprocable member relative to the ends of said article to effect partial end folds thereon, folding members arranged for movement from an initial position into position opposite said ends of the article, and means for moving said folding members in a direction against the corresponding ends of said article substantially simultaneously with the end folding operation of the means moved by said reciprocable member, and means including spaced stationary terminal folding members disposed opposite a terminal position of said reciprocable member and between which an article partially wrapped as aforesaid by action of said reciprocable member and said end folding members is subsequently moved to effect further end folds on the article, and means actuated in timed relation to the wrapping movement of said reciprocable member to move a partially wrapped article in between said terminal folding members.

17. In a wrapping machine, a reciprocable wrapping carriage mounted for movement toward and away from a partially wrapped article, spaced end folding means on said carriage and moved therewith crosswise of the opposite end portions of said partially wrapped article to effect further end folds thereon, a bottom folding member mounted on said carriage for movement relative to the carriage beneath the bottom of the partially wrapped article, spring means normally urging said bottom folding member toward the carriage in a direction away from the partially wrapped article, releasable coupling means arranged for automatic engagement with said bottom folding member to restrain movement thereof from beneath an article when said carriage is moved away therefrom after effecting partial folds thereon as aforesaid, said coupling means being arranged and constructed to release automatically when the carriage is moved a certain distance away from the partially wrapped article, whereby to effect quick withdrawal of said bottom folding member from beneath said article by action of said spring means.

18. In a wrapping machine including a wrapping member arranged for movement back and forth toward and away from a partially wrapped article, bottom folding means including a member mounted on said wrapping member for movement relative thereto, means yieldingly urging said bottom folding member into a normal position toward said wrapping member, means for moving said wrapping member toward said article to effect further wrapping operations thereon, coupling means and mechanism arranged to effect automatic coupling operation for coupling with said bottom folding member prior to the time the latter is moved beneath an article by movement of said wrapping member toward the article, said last-mentioned mechanism being further arranged to restrain movement of said bottom folding member from beneath the article upon movement of said wrapping member away from the article, said coupling means being arranged to release automatically to free said bottom folding member for movement by said spring means from beneath the article.

19. In a bread wrapping machine having means for effecting a partial wrapping of a loaf by movement of the loaf against a wrapper to drape the latter substantially around three sides of the loaf with portions projecting beyond the opposite ends of the loaf, folding mechanism comprising: a reciprocable carriage provided with folding means moved thereby crosswise of said opposite ends and beneath said loaf to effect further folds on the wrapper, a pair of folding wings arranged for movement from an initial position into substantially confronting position opposite the ends of the loaf, and means for moving said wings toward confronting position in timed relation to the movement of said carriage toward the loaf for substantially successive folding action of said wings and end folding means on the carriage, and means moved by said carriage into engagement with said wings to urge the latter in a direction against said ends of the loaf at a time during the folding action of said wings, and mechanism for moving a loaf into and out of wrapping position relative to said carriage and wings.

20. In a bread wrapping machine, paper supporting and tautening means for cooperation with a wrapping elevator and comprising: spaced wrapper supporting means arranged to position a wrapping sheet in a plane transverse to the movement of said elevator, stationary presser members disposed on the opposite side of said supporting means in the direction of approach of said elevator thereto, and on opposite sides of the path of movement of said elevator, and movable paper pressing means mounted closely adjacent said spaced supporting means and normally urged by spring means in a direction against a wrapping sheet to press the latter against said stationary presser members, and mechanism driven cooperably in timed relation with the movement of said elevator for retracting said movable pressing means prior to the movement of said elevator toward the wrapping sheet prior to movement by said elevator of a loaf in wrapping engagement with a wrapper positioned as aforesaid, said lost-mentioned mechanism further being arranged to effect retractive movement of said movable pressing means substantially at the time when said elevator has completed wrapping movement of the loaf relative to said wrapper.

21. In a wrapping machine, the combination, with an article carrier which retreats and advances to move an article into a wrapper and fold the wrapper partly on the article, of paper supporting and tautening means comprising spaced members arranged to support a wrapper in a plane transverse to the path of said carrier wherein the latter may move an article against the wrapper as aforesaid, stationary presser means arranged in spaced relation relative to each other at one side of said supporting means opposite the direction of advance of the carrier toward the supported wrapper, and means for pressing said wrapper against said stationary presser means and comprising reciprocating pressing members associated with each of said supporting members, together with drive mechanism for moving said carrier and reciprocating pressing members in timed relation whereby to press a wrapper against said stationary pressing members during movement of an article into the wrapper by the carrier as aforesaid and to withdraw said reciprocable pressing members from pressing relationship relative to said stationary presser members and into an initial position upon or during the retreat of the carrier.

22. In a wrapping machine, paper supporting and tautening means comprising spaced horizontal supporting members adapted to support a wrapper in a horizontal plane, stationary presser members mounted in spaced relationship to each other at one side of said plane, movable pressing members each arranged for movement back and forth from an initial position of retraction with respect to one of said horizontal supporting members toward a wrapper thereon and to press said wrapper against said stationary presser members, and means for effecting retractive and advancing movement of the movable pressing members in the manner aforesaid.

23. In a wrapping machine, initial and intermediate wrapping means including a reciprocable article carrier arranged to effect partial wrapping of an article by moving the same into a wrapper disposed in the path of the carrier in transporting an article to a terminus of the carrier, a pair of reciprocably carriages arranged in series fashion at said terminus with one of the carriages on either side of the terminus, means for moving said carriages jointly in timed relationship to the movement of said carrier in transporting an article to said terminus, whereby a particular one of said carriages will be moved toward the partially wrapped article, folding means on said particular carriage arranged to effect further folds at the ends and bottom of the partially wrapped article at the terminus, the completion of the wrapping of the article being effected by movement of the same relative to a terminal folding means situated at the side of said terminus which is in the direction of movement of said particular carriage toward the article in wrapping operation, and means coacting with the other carriage to move the partially wrapped article relative to said terminal folding means following completion of the folding operation of the particular carriage as aforesaid.

24. In a wrapping machine, intermediate folding means including a pair of reciprocable members mounted for movement in tandem relationship, means for disposing a partially wrapped article in an intermediate wrapping position between said reciprocable members so as to lie in the path of a particular one of the latter, means moved by said particular reciprocable member relative to the ends and bottom of the article in intermediate wrapping position to effect certain end and bottom folds thereon, means moved toward and beneath said article from the side thereof opposite said particular reciprocable member to effect further bottom folding, end folding means and mechanism for actuating the same to effect partial end folds in advance of the end folding operation of said particular reciprocable member, and means coacting with the other reciprocable member for pushing an article away from said intermediate wrapping position subsequent to the wrapping operation of the several end and bottom folding means aforesaid.

25. A wrapping machine having, in combination, initial wrapping means comprising an article carrier arranged to move an article against a spread wrapper to drape the same substantially on three sides thereof with portions of the wrapper projecting beyond the ends of the article and to dispose the initially wrapped article at an intermediate wrapping station, intermediate wrapping mechanism including a carriage mounted to reciprocate toward and away from the article at said station, means on said carriage moved relative to the projecting wrapper portions at the end of the article to effect partial end folds when the carriage moves toward the article, means including a pair of end fold wings arranged for movement from an initial position crosswise of the ends of said article to effect further end folds, means including a bottom fold member moved by said carriage beneath said article at one side thereof to effect a partial bottom fold and in part support the article independently of said carrier, a second bottom folding member moved beneath the opposite side of said article to effect a remaining bottom fold and support said article cooperably with said first-mentioned bottom folding member independently of the carrier, and terminal folding means positioned at one side of said intermediate wrapping station opposite said carriage, mechanism arranged to engage an article at said station and move the same into operative engagement with said terminal folding means, sealing means arranged on a side of said terminal folding means remote from said station, and mechanism arranged to move an article engaged with said terminal folding means into operative engagement with said sealing means, together with driving mechanism for actuating said carrier, said carriage, said end folding wings, said bottom folding means and said means for moving the article into and out of engagement with the terminal folding and sealing means in timed relationship to effect wrapping and sealing in the manner aforesaid.

26. In a wrapping machine, a pair of carriages arranged for reciprocable movement in tandem relationship, wrapping instrumentalities actuated by said carriages, mechanism including an article carrier for moving an article into wrapping relationship with respect to said carriages, drive mechanism for actuating said carriages and article carrier in coordinated relationship and arranged to move one of said carriages at a different rate from the other whereby the one carriage will overtake the other at a certain time during each cycle of wrapping operation thereof, automatic coupling means on the overtaking carriage and arranged to couple with wrapping means on the overtaken carriage during each cycle of wrapping operation of the carriages as aforesaid, said drive mechanism is being arranged to move said overtaking carriage away from the other carriage at a subsequent time during each cycle of operation whereby to effect release of said coupling means.

ISRAEL C. GELLMAN.